US007900946B2

(12) United States Patent
Hara et al.

(10) Patent No.: US 7,900,946 B2
(45) Date of Patent: Mar. 8, 2011

(54) BICYCLE SHIFTING CONTROL APPARATUS

(75) Inventors: Nobukatsu Hara, Osaka (JP);
Toshikuni Suzuki, Osaka (JP);
Kazuhiro Takeda, Osaka (JP)

(73) Assignee: Shimano Inc., Osaka (JP)

( * ) Notice: Subject to any disclaimer, the term of this patent is extended or adjusted under 35 U.S.C. 154(b) by 29 days.

(21) Appl. No.: 12/414,714

(22) Filed: Mar. 31, 2009

(65) Prior Publication Data

US 2010/0244401 A1  Sep. 30, 2010

(51) Int. Cl.
 *B62M 1/02* (2006.01)
(52) U.S. Cl. ............................. 280/260; 474/70; 280/238
(58) Field of Classification Search .................. 280/238, 280/259, 260, 261; 474/69, 70
See application file for complete search history.

(56) References Cited

U.S. PATENT DOCUMENTS

| | | | |
|---|---|---|---|
| 586,545 A | 7/1897 | Craton | |
| 7,144,027 B2 | 12/2006 | Kitamura et al. | |
| 7,338,059 B2 | 3/2008 | Sugimoto | |
| 7,614,971 B2* | 11/2009 | Fujii et al. | 474/70 |
| 2003/0100392 A1 | 5/2003 | Ichida | |
| 2003/0160420 A1* | 8/2003 | Fukuda | 280/260 |
| 2005/0109577 A1 | 5/2005 | Uno et al. | |
| 2005/0223840 A1 | 10/2005 | Takamoto | |
| 2007/0207885 A1* | 9/2007 | Watarai | 474/70 |
| 2008/0121066 A1 | 5/2008 | Takebayashi et al. | |
| 2010/0218633 A1* | 9/2010 | Ichida et al. | 74/473.12 |

* cited by examiner

*Primary Examiner* — Tony H. Winner
(74) *Attorney, Agent, or Firm* — Global IP Counselors, LLP

(57) ABSTRACT

A bicycle shifting control apparatus is provided with a gear selection signal receiving section, a gearshift determination section and a gearshift output section. The gear selection signal receiving section selectively receives a first gear selection signal and a first/second gear selection signal. The gearshift determination section determines a first rider shift intention for first gear shifting when the first gear selection signal is received, which meets a first signal criteria, and determines a second rider shift intention for performing second gear shifting in addition to the first shifting when the first/second gear selection signal is received by, which meets a second (different) signal criteria. The gearshift output section outputs a first gearshift signal upon determining the first rider shift intention or the second rider shift intention exists and outputs a second gearshift signal upon determining that the second rider shift intention exists.

23 Claims, 15 Drawing Sheets

BICYCLE SHIFTING CONTROL APPARATUS

BACKGROUND OF THE INVENTION

1. Field of the Invention

This invention generally relates to a bicycle shifting control apparatus. More specifically, the present invention relates to a bicycle shifting control apparatus that operates both front and rear gear shifting devices in opposite gear directions response to operation of a gearshift operating device.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, the bicycle transmission has been significantly changed over the years.

Recently, bicycle transmissions have been equipped with electrical components to make riding easier and more enjoyable for the rider. Some bicycles are equipped with electrically controlled shifting systems. In particular, in theses electrically controlled shifting systems, front and rear gearshift operating devices are typically provided on the bicycle handlebar to operate front and rear gear shifting devices (e.g., motorized derailleurs). The front and rear gear shifting devices (e.g., motorized derailleurs) are provided with electric motors that move their respective chain guides laterally to shift the bicycle chain between the various gears for obtaining a desired gear position. Typically, bicycles equipped with electrically controlled shifting systems are also provided with an electrical power supply such as a battery or a generator. One example of an electrically controlled shifting system is disclosed in U.S. Pat. No. 7,144,027, which is assigned to Shimano, Inc.

Typically, these electrically controlled shifting systems are responsive to the operation of operating members (e.g., manual buttons or levers, or the like) to perform a shifting operation. In these prior electrically controlled shifting apparatuses, in a manually mode the rider can separately shift a front gear and a rear gear by operating a pair of front operating members for the front derailleur and a pair of rear operating members for the rear derailleur. In automatic mode, the rider uses only two operating members to shift a gear ratio one by one.

SUMMARY OF THE INVENTION

One object of the present invention is to provide a bicycle shifting control apparatus that both front and rear gear shifting devices in opposite speed directions response to operation of a gearshift operating device such that an operation of one gear shifting device is based on an operation of another gearshift operating device.

According to one aspect, a bicycle shifting control apparatus is provided that basically comprises a gear selection signal receiving section, a gearshift determination section and a gearshift output section. The gear selection signal receiving section selectively receives a first gear selection signal and a first/second gear selection signal. The gearshift determination section determines a first rider shift intention for first gear shifting when the first gear selection signal is received by the gear selection signal receiving section, which meets a first signal criteria, and determines a second rider shift intention for performing second gear shifting in addition to the first shifting when the first/second gear selection signal is received by the gear selection signal receiving section, which meets a second signal criteria that is different from the first signal criteria. The gearshift output section outputs a first gearshift signal upon the gearshift determination section determining the first rider shift intention or the second rider shift intention and outputs a second gearshift signal upon the gearshift determination section determining that the second rider shift intention.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
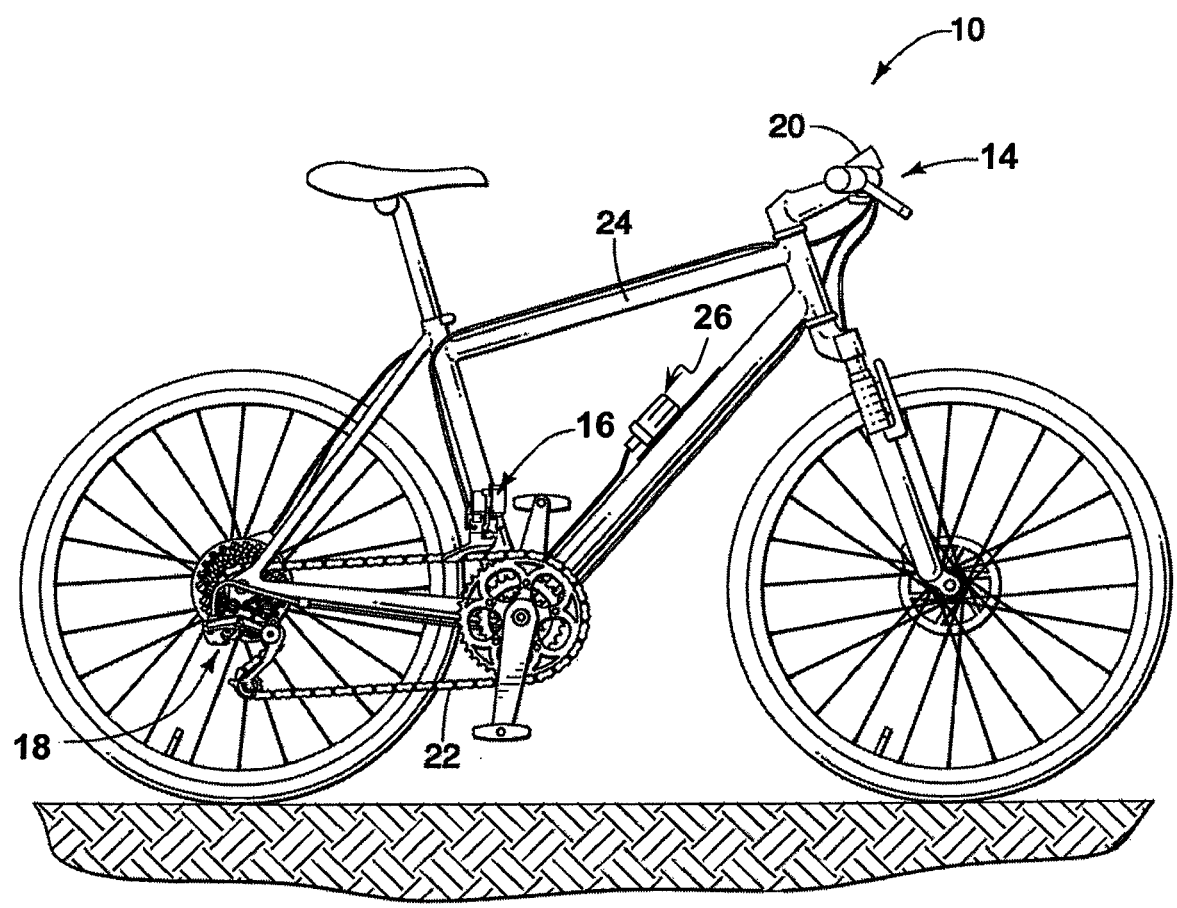
FIG. 1 is a side elevational view of a bicycle that is equipped with a bicycle shifting control apparatus in accordance with a first embodiment.
Figure 2:
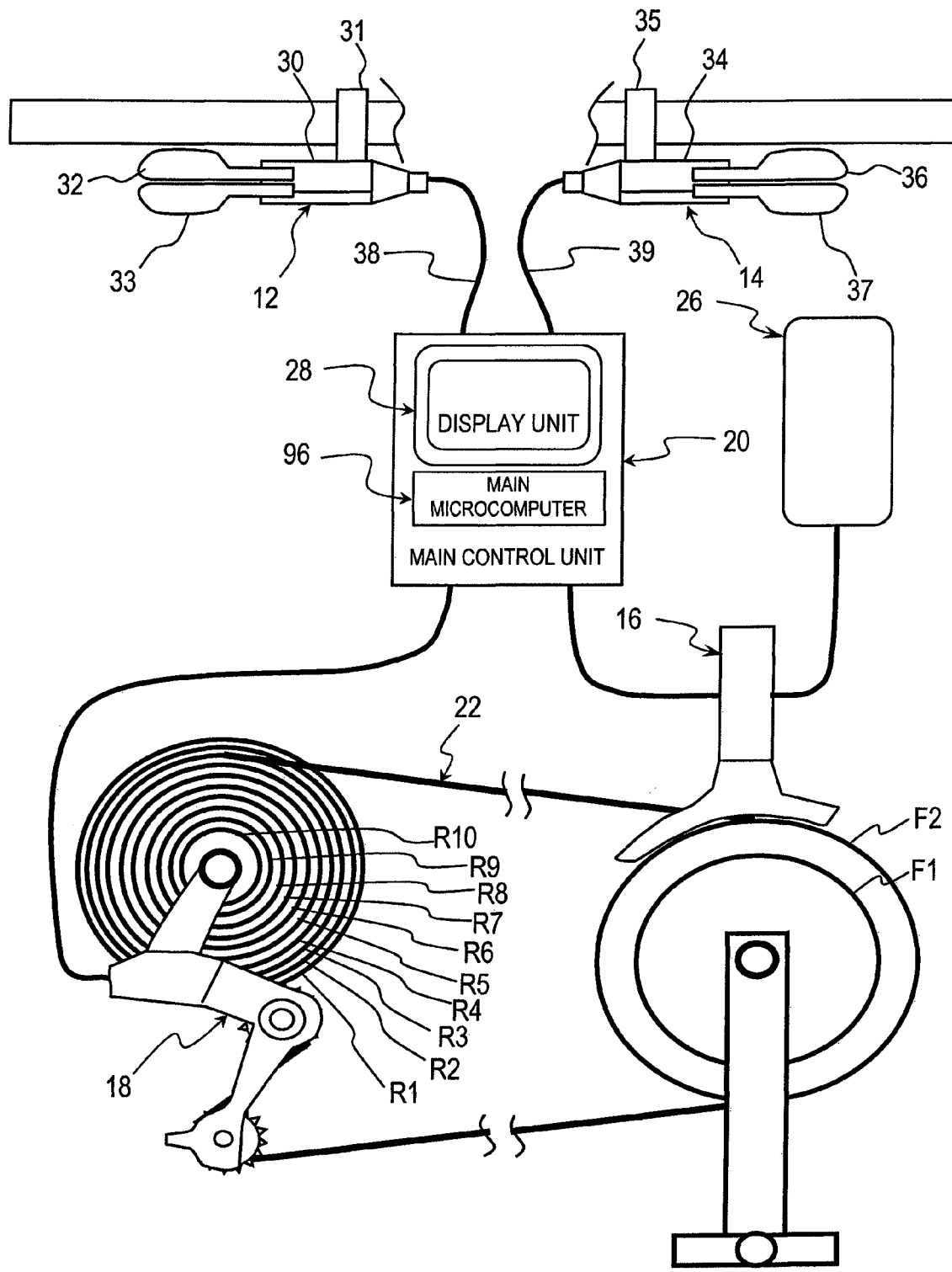
FIG. 2 is a schematic diagram showing one example of a derailleur type of drive train including front and rear derailleurs (i.e., gear shifting devices), front and rear sprockets and a chain that is used in the bicycle illustrated in FIG. 1.

Referring initially to FIG. 1, a bicycle 10 is illustrated that is equipped with a bicycle shifting control apparatus in accordance with a first embodiment. As seen in FIGS. 1 and 2, the bicycle shifting control apparatus basically includes a left hand side (front/rear) shifter 12, a right hand side (rear) shifter 14, a motorized front derailleur 16 (FD), a motorized rear derailleur 18 (RD) and a main control unit 20. Basically, in order to shift gears, the derailleurs 16 and 18 are operated to move a chain 22 laterally with respect to a bicycle frame 24 in response to operation of the shifters 12 and 14.

The bicycle shifting control apparatus is also provided with a power supply or battery 26 for supplying electrical power to the front and rear derailleurs 16 and 18 and the main control unit 20. Optionally, the bicycle shifting control apparatus is also provided with a display unit 28 that can be part of the main control unit 20 or a separate member that is electrically connected to the main control unit 20. Other than the bicycle shifting control apparatus, as explained below, the bicycle 10 can be any type of bicycle. Thus, the parts of the bicycle 10 will not be discussed herein, except for those parts that will assist in the understating of the bicycle shifting control apparatus.

As seen in FIG. 1, the front derailleur 16 is mounted to a seat tube of the frame 24, while the rear derailleur 18 is mounted to a rear portion of a chain stay of the frame 24. The front and rear derailleurs 16 and 18 are configured such that they can be controlled electrically by the shifters 12 and 14, respectively. The front and rear derailleurs 16 and 18 can be conventional electronic derailleurs that have been adapted for the bicycle shifting control apparatus as disclosed herein. The shifter 12 constitutes a first or front gearshift operating device, while the shifter 14 constitutes a second or rear gearshift operating device. The motorized front derailleur 16 constitutes a first or front gear shifting device, while the motorized rear derailleur 18 constitutes a second or rear gear shifting device. Of course, the uses of "first" and "second" in referring to the parts of the bicycle shifting control apparatus are merely labels that can be reversed with respect to the various parts including, but not limited to, the shifters 12 and 14 and the derailleurs 16 and 18.

While the front and rear derailleurs 16 and 18 (external gear shifting devices) are used to the illustrated embodiment, it will be apparent to those skilled in the art from this disclosure that any type of external and/or internal gear shifting devices can be used to carry out the present invention. In other words, the shifters 12 and 14 can be used in conjunction with the main control unit 20 to operate any type of external and/or internal gear shifting devices as needed and/or desired.

As used herein, the term "upshift" refers to a change in a gear ratio of a transmission that results in the bicycle wheels rotating faster per rotation of the crank arms. As used herein, the term "downshift" refers to a change in a gear ratio of a transmission that results in the bicycle wheels rotating slower per rotation of the crank arms.

In this first embodiment, the left hand side (front/rear) shifter 12 is operatively coupled to both the motorized front derailleur 16 (FD) and the motorized rear derailleur 18 (RD). Thus, the rider can selectively either operate the motorized front derailleur 16 to perform a single shifting operation, or operate the motorized front derailleur 16 and the motorized rear derailleur 18 together to perform a synchronized shifting operation. As used herein, the term "together" as referring to shifting does not require simultaneous operations of the front and rear derailleurs 16 and 18, but rather refers to an operation of a first gear shifting device and an operation of a second gear shifting device with the operation of the second gear shifting device being based on the operation of a first gear shifting device. While in the illustrated embodiment, the first gear shifting device is the front derailleur 16 and the second gear shifting device is the rear derailleur 18, it will be apparent to those skilled in the art from this disclosure that the second gear shifting device can be the front derailleur 16 and the first gear shifting device can be the rear derailleur 18.

For example, as diagrammatically illustrated in FIG. 2, the drive train of the bicycle 10 basically includes a pair of front sprockets F1 and F2 mounted to the crank axle in a conventional manner, and a set of rear sprockets R1 to R10 mounted to the rear axle of the rear wheel in a conventional manner. The chain 22 is operatively coupled between the rear sprockets R1 to R10 and the front sprockets F1 and F2 in a conventional manner. The front derailleur 16 (e.g., the first gear shifting device) shifts the chain 22 between the front sprockets F1 and F2 in response to operation of the left hand side (front/rear) shifter 12, while the rear derailleur 18 (e.g., the second gear shifting device) shifts the chain 22 between the rear sprockets R1 to R10 in response to operation of the right hand side (rear) shifter 14 or the left hand side (front/rear) shifter 12. While two front sprockets and ten rear sprockets are illustrated, it will be apparent from this disclosure that the bicycle shifting control apparatus can be used with a drive train having three or more front sprockets and fewer or more rear sprockets.

In this illustrated example, the smaller (inner) sprocket F1 has twenty-nine teeth and the large (outer) sprocket F2 has forty-two teeth. Also in this illustrated example, the rear sprockets R10 to R1 are cassette sprockets that are provided with a teeth gearing arrangement as follows: 11-13-15-17-19-21-23-26-30-34, respectively. Of course, other size sprockets with different teeth gearing arrangements can be used as needed and/or desired.

Below is a table illustrating the various gear ratios that can be attained, depending on which of the front and rear sprockets are engaged by the chain 22. A high gear ratio refers to a higher bicycle speed per rotation of the crank arms, while a low gear ratio refers to a lower bicycle speed per rotation of the crank arms.

| F1 (Low Gear) (Teeth) | R# (Teeth) (CS) | Gear Ratio | F2 (Top Gear) (Teeth) | R# (Teeth) (CS) | Gear Ratio |
|---|---|---|---|---|---|
| 29 | 11 | 2.64 | 42 | 11 | 3.82 |
| 29 | 13 | 2.23 | 42 | 13 | 3.23 |
| 29 | 15 | 1.93 | 42 | 15 | 2.80 |
| 29 | 17 | 1.71 | 42 | 17 | 2.47 |
| 29 | 19 | 1.53 | 42 | 19 | 2.21 |
| 29 | 21 | 1.38 | 42 | 21 | 2.00 |
| 29 | 23 | 1.26 | 42 | 23 | 1.83 |
| 29 | 26 | 1.12 | 42 | 26 | 1.62 |
| 29 | 30 | 0.97 | 42 | 30 | 1.40 |
| 29 | 34 | 0.85 | 42 | 34 | 1.24 |

As can be seen from the above table, when the rider shifts between the front sprockets F1 and F2, a large change in the gear ratio occurs as compared to when the rider shifts between adjacent ones of the rear sprockets R1 to R10. With the bicycle shifting control apparatus of this first embodiment, the rider can operate the left hand side (front/rear) shifter 12 such that both the motorized front derailleur 16 and the motorized rear derailleur 18 are shifted together. Therefore, if the road's slant becomes slight or steep, the rider chose gear ratio more freely, and the rider can maintain cadence.

In this illustrated embodiment, as explained below, the rider can operate the left hand side (front/rear) shifter 12 in a single progressive shifting operation such that the motorized front derailleur 16 moves the chain 22 from the smaller (inner) sprocket F1 to the large (outer) sprocket F2, or vice-a-versa, and the motorized rear derailleur 18 moves the chain 22 one or two gears in the opposite shifting direction to lessen the amount that the gear ratio changes as compared to if only the chain 22 is moved from the smaller (inner) sprocket F1 to the large (outer) sprocket F2, or vice-a-versa. In other words, if the motorized front derailleur 16 is upshifting, then the motorized rear derailleur 18 is downshifting one or two gears when the rider desires to shift both the front and rear derailleurs 16 and 18 together.

In the case of the above example, if the chain 22 is engaging the large (outer) sprocket F2 with forty-two teeth and the rear sprocket R4 with twenty-three teeth, then the transmission has a gear ratio of 1.83 (42/23). When the rider performs a front and rear synchronized shifting operation with a one gear front downshift and a two gear rear upshift, then the chain 22 engages the smaller (inner) sprocket F1 with twenty-nine teeth and the rear sprocket R6 with twenty-three teeth such that the transmission has a gear ratio of 1.53 (29/19). However, if the rider operated the left hand side (front/rear) shifter 12 to perform only a downshift from the front sprocket F2 to the front sprocket F1, then the transmission would have a gear ratio of 1.26 (29/23). Thus, the rider can easily attain a smaller change in the gear ratio of the transmission by performing a synchronized shifting operation in which the operation of one of the gear shifting devices is based on the operation of the other gear shifting device. The front and rear derailleurs 16 and 18 are configured such that a value of change (e.g., gear ratio) when only the front derailleur 16 is changed one speed is larger than a value of change (e.g., gear ratio) that when only the rear derailleur 18 is changed one speed.

The shifters 12 and 14 are operated by the rider in order to control movement (e.g., perform gear shifting operations) of the front and rear derailleurs 16 and 18 with respect to the front sprockets F1 and F2 and the rear sprockets R1 to R10, respectively. Since the drive train is conventional, the drive train will not be discussed in more detail herein. Moreover, the bicycle shifting control apparatus is not limited to a derailleur type drive train as illustrated herein. Rather, it will be apparent from this disclosure that the bicycle shifting control apparatus can be used with other types of drive trains that use electric gear shifting devices.

Referring back to FIG. 2, the left hand side shifter 12 is a front electronic shifter having a shifter housing 30, a handlebar clamp 31, a downshift (inward) operating lever 32 and an upshift (outward) operating lever 33. The right hand side shifter 14 is a rear electronic shifter having a shifter housing 34, a handlebar clamp 35, a downshift (inward) operating lever 36 and an upshift (outward) operating lever 37. In this embodiment, the operating levers 32 and 33 are pivotally attached to the shifter housing 30, while the operating levers 36 and 37 are pivotally attached to the shifter housing 34.

The operating levers 32 and 33 constitute rider front gear input members while the operating levers 36 and 37 constitute rider rear gear input members. The operating levers 32 and 33 also constitute rider front/rear gear input members as explained below. Of course, it will be apparent from this disclosure that other types of electronic shifters (e.g., push-button type operating members) can be used as needed and/or desired. The shifters 12 and 14 are electrically connected to the main control unit 20 by electrical cords 38 and 39, respectively.

In this first embodiment, when the rider wants to shift the front derailleur 16, the rider is also able to shift the rear derailleur 18 at the same time or almost the same time using either the operating lever 32 to decrease the gear ratio of the transmission, or the operating lever 33 to increase the gear ratio of the transmission. As explained below, the main control unit 20 is programmed and configured to perform a synchronized shifting operation in which a rear synchro gearshift signal is output based on a front gear selection signal being received. In other words, a rear synchro gearshift signal is output in response to receiving a front gear selection signal.

Thus, the operating lever 32 constitutes a gear downshift operating member, while the operating lever 33 constitutes a gear upshift operating member, with one of the downshift and upshift operating members 32 and 33 constituting a first single rider gear input member and the other of the downshift and upshift operating members 32 and 33 constituting a second single rider gear input member.

Basically, when the rider operates the operating lever 32 to a first position (one short push) with the chain 22 engaged with the large front sprocket F2, the front derailleur 16 shifts the chain 22 from the large front sprocket F2 to the small front sprocket F1 and the chain 22 is not shifted with respect to the rear sprockets R1 to R10. When the rider operates the operating lever 32 to a second position (one long push) with the chain 22 engaged with the large front sprocket F2, the front derailleur 16 shifts the chain 22 from the large front sprocket F2 to the small front sprocket F1 and the rear derailleur 18 shifts the chain 22 from one of the rear sprockets R1 to R10 to another one of the rear sprockets R1 to R10 so that the gear ratio of the transmission decreases. Similarly, when the rider operates the operating lever 33 to a first position (one short push) with the chain 22 engaged with the small front sprocket F1, the front derailleur 16 shifts the chain 22 from the small front sprocket F1 to the large front sprocket F2 and the chain 22 is not shifted with respect to the rear sprockets R1 to R10. When the rider operates the operating lever 33 to a second position (one long push) with the chain 22 engaged with the small front sprocket F1, the front derailleur 16 shifts the chain 22 from the small front sprocket F1 to the large front sprocket F2 and the rear derailleur 18 shifts the chain 22 from one of the rear sprockets R1 to R10 to another one of the rear sprockets R1 to R10 so that the gear ratio of the transmission increases. Therefore, if the road's slant becomes slight or steep, the rider can chose gear ratio more freely, and the rider can maintain cadence. If rider shifts the front gear, and want to shift the rear gear, it is not necessary to operate another shift lever (e.g., only pushing one of the operating levers 36 and 37 is needed to shift the chain 22 between the front sprockets F1 and F2 and the rear sprockets R1 to R10).

Preferably, a first clicking (audible) mechanism or a haptic mechanism (not shown) is provided for indicating when the downshift (inward) operating lever 32 has reached the first position (one short push), and a second clicking (audible) mechanism or a haptic mechanism (not shown) is provided for indicating when the upshift (outward) operating lever 33 has reached the first position (one short push). Thus, these clicking (audible) mechanisms or haptic mechanisms will alert the rider when the first position (one short push) has been reached so as to avoid accidently performing a synchronized shifting operation of both of the front and rear derailleurs 16 and 18.

Figure 3:
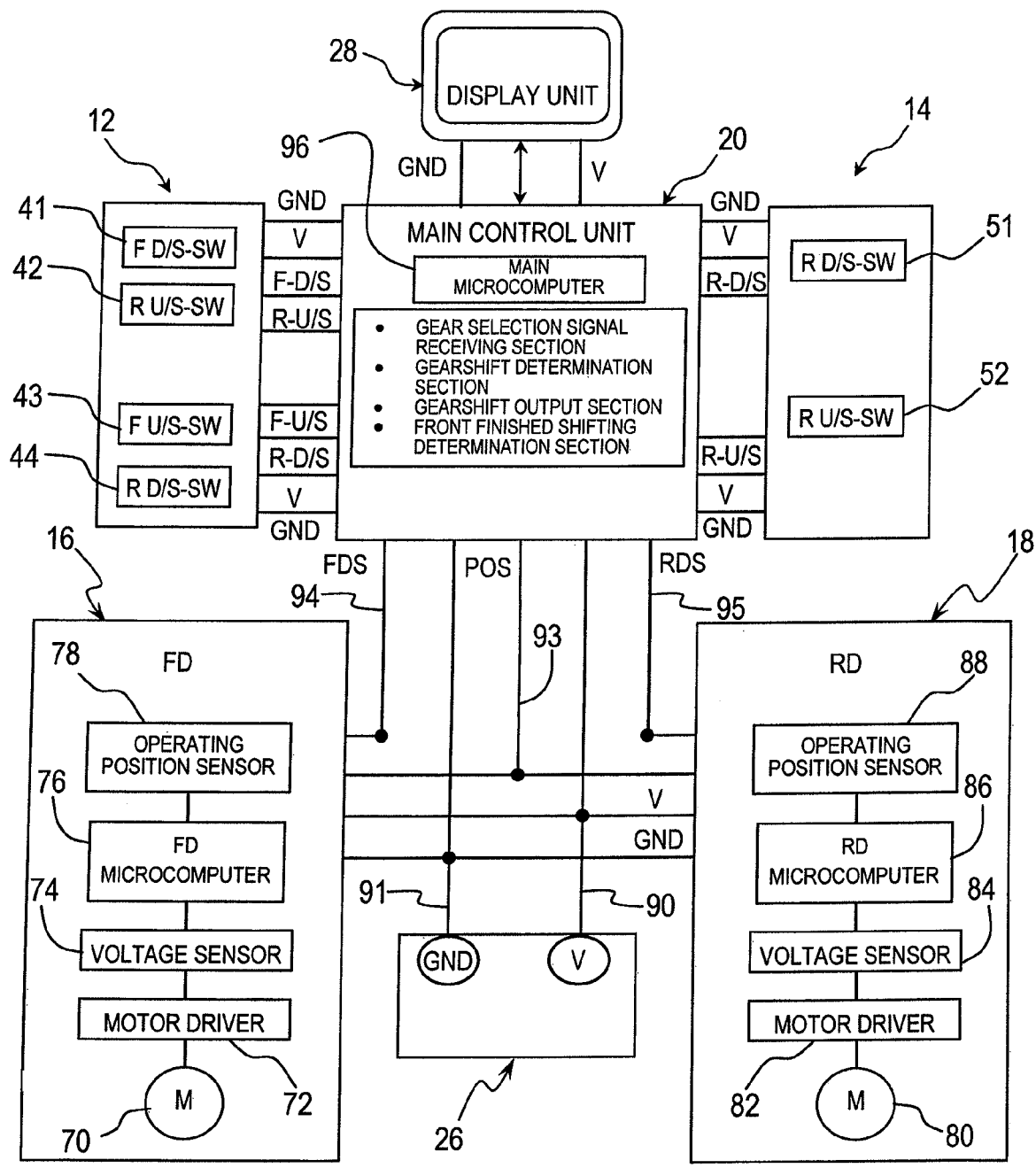
FIG. 3 is a schematic block diagram showing the entire configuration of the bicycle shifting control apparatus in accordance with the first embodiment.
Figure 4:
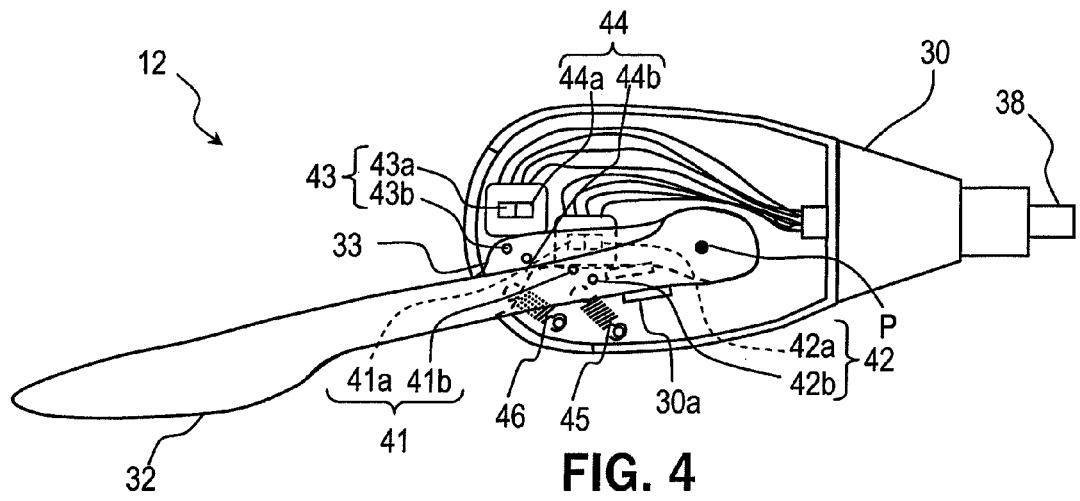
FIG. 4 is a top plan view of the left hand shifter with the top cover of the housing removed to illustrate the operating levers in their rest position.
Figure 5:
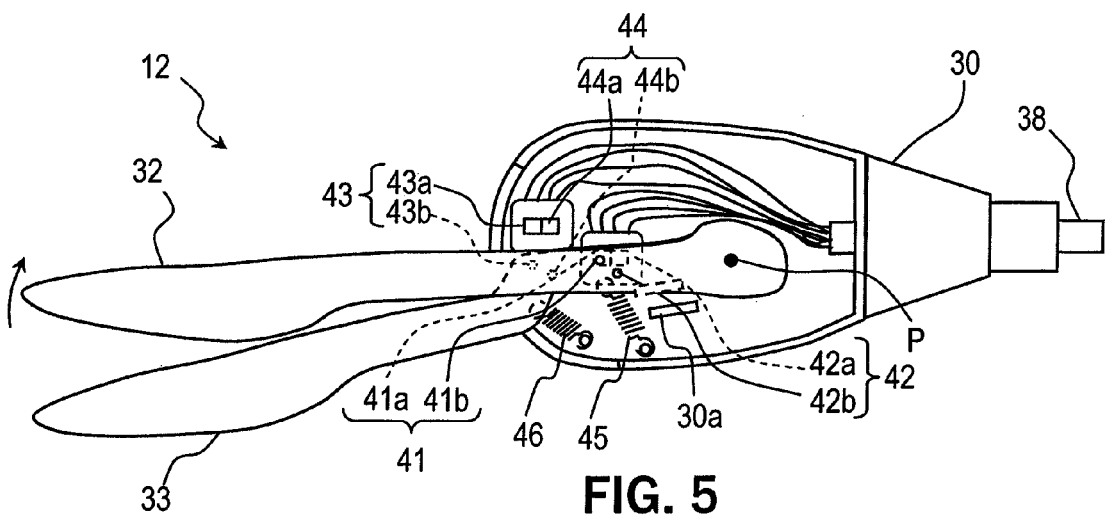
FIG. 5 is a top plan view of the left hand shifter with the top cover of the housing removed to illustrate the front derailleur upshift lever in a first shift operating position for performing a single gear upshift.

As diagrammatically seen in FIG. 3, in this first embodiment, the left hand side shifter 12 is preferably provided with four shift switches that produce shift control signals for operating both of the front and rear derailleurs 16 and 18. In particular, the left hand side shifter 12 is includes a front derailleur downshift switch 41, a rear derailleur upshift switch 42, a front derailleur upshift switch 43 and a rear derailleur downshift switch 44. Here, the shift switches 41 to 44 are contactless switches as explained below. However, it will be apparent from this disclosure that other types of switches can be used as needed and/or desired.

The downshift (inward) operating lever 32 and the upshift (outward) operating lever 33 are preferably trigger levers that returns to a rest position after being moved to an operating position for performing a shifting operation. In particular, the downshift (inward) operating lever 32 is spring loaded toward the rest position by a spring member 45 (e.g., a spiral tension spring) such that the downshift (inward) operating lever 32 rests against a stop 30a of the shifter housing 30. The spring member 45 has one end engaged with the downshift (inward) operating lever 32 and the other end engaged with the shifter housing 30. Similarly, the upshift (outward) operating lever 33 is spring loaded toward the rest position by a spring member 46 (e.g., a spiral tension spring) such that the upshift (outward) operating lever 33 rests against a stop 30b (FIG. 6) of the shifter housing 30. The spring member 46 has one end engaged with the upshift (outward) operating lever 33 and the other end engaged with the shifter housing 30.

Thus, the operating levers 32 and 33 each constitutes a first single rider gear input member that is movably mounted to move between a rest position, a first operation position (e.g., a short stroke length) and a second operation position (e.g., a long stroke length) that is past the first operation position during a single progressive stroke of the first single rider gear input member from the rest position to the second operation position such that the first operation manner occurs when the first single rider gear input member is moved from the rest position to the first operation position and such that the second operation manner occurs when the first single rider gear input member is moved from the rest position to the second operation position.

Figure 6:
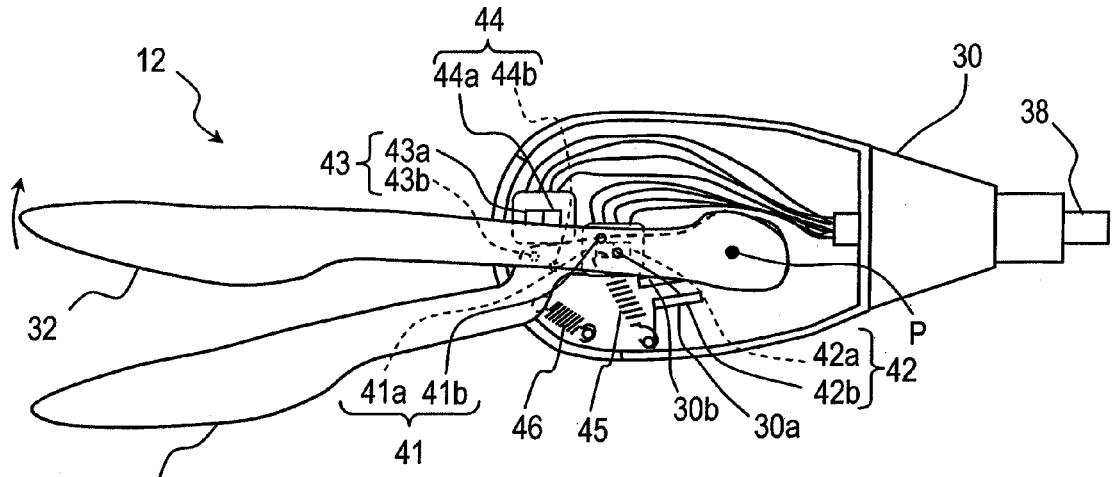
FIG. 6 is a top plan view of the left hand shifter with the top cover of the housing removed to illustrate the front derailleur upshift lever in a second shift operating position for performing an upshift of the front derailleur and a downshift of the rear derailleur.
Figure 7:
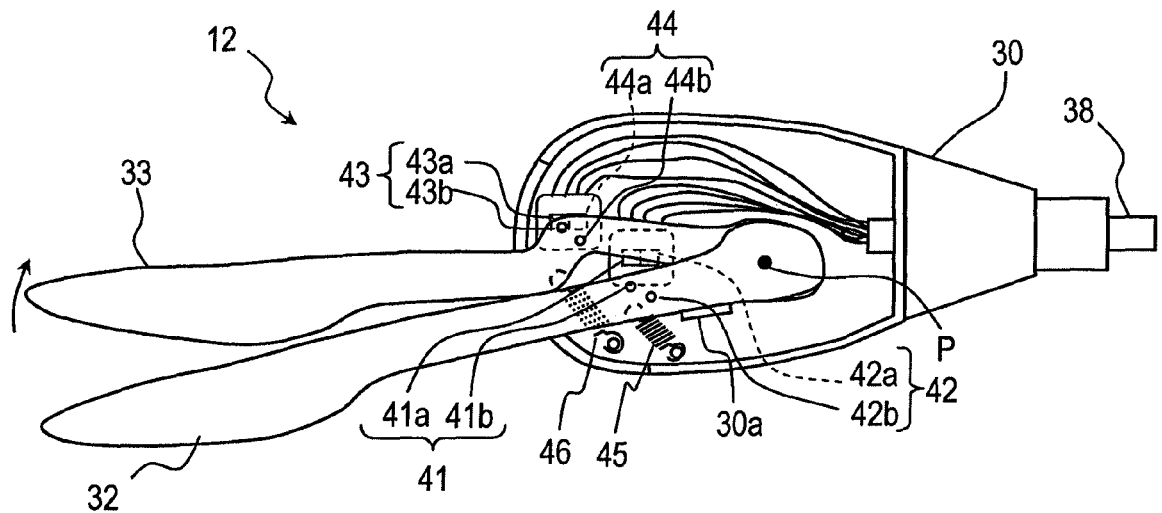
FIG. 7 is a top plan view of the left hand shifter with the top cover of the housing removed to illustrate the front derailleur downshift lever in a first shift operating position for performing a single gear downshift.
Figure 8:
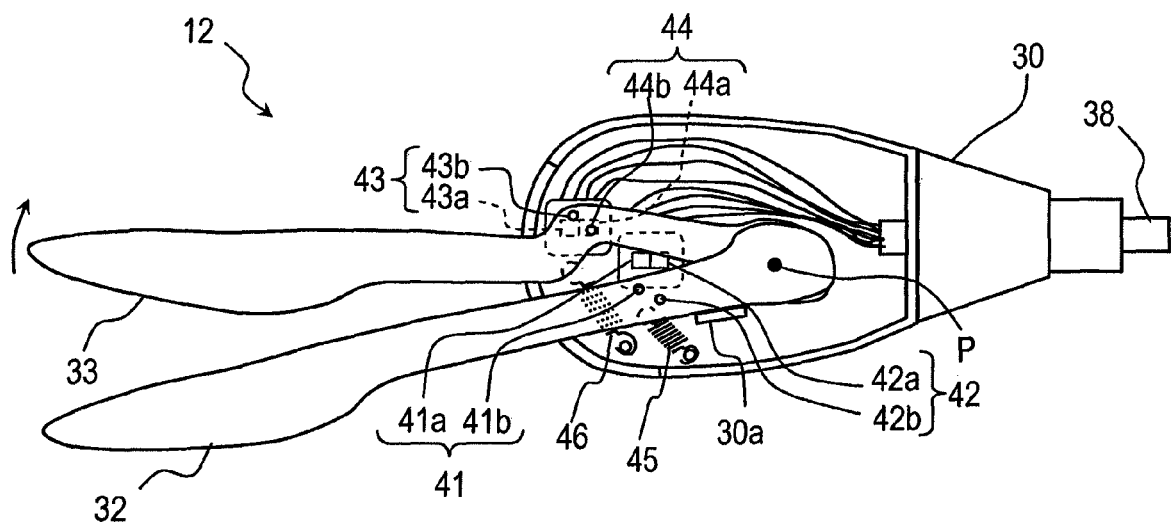
FIG. 8 is a top plan view of the left hand shifter with the top cover of the housing removed to illustrate the front derailleur downshift lever in a second shift operating position for performing a downshift of the front derailleur and an upshift of the rear derailleur.

As seen in FIG. 6 to 8, the front derailleur downshift switch 41 and the rear derailleur upshift switch 42 are operated by the downshift (inward) operating lever 32, while the front derailleur upshift switch 43 and the rear derailleur downshift switch 44 are operated by the upshift (outward) operating lever 33. The front derailleur downshift switch 41 basically includes a magnetic sensor 41a and a magnet 41b that form a magnet sensing unit. The rear derailleur upshift switch 42 basically includes a magnetic sensor 42a and a magnet 42b that form a magnet sensing unit. The front derailleur upshift switch 43 basically includes a magnetic sensor 43a and a magnet 43b that form a magnet sensing unit. The rear derailleur downshift switch 44 basically includes a magnetic sensor 44a and a magnet 44b that form a magnet sensing unit. Of course, the shift switches 41 to 44 are not limited to magnet sensing units. For example, contact switches, optical sensors, etc. can be used as needed and/or desired.

The magnetic sensors 41a and 42a are disposed on a first printed circuit board that is rigidly attached to the inside of the shifter housing 30 of the left hand side shifter 12, while the magnetic sensors 43a and 44a are disposed on a second printed circuit board that is rigidly attached to the inside of the shifter housing 30 of the left hand side shifter 12. Each of the printed circuit boards has a ground wire conductor GND, a power wire conductor V, a first signal wire conductor F-D/S or F-U/S and a second signal wire conductor R-D/S or R-U/S, which are all electrically connected to the main control unit 20 as diagrammatically illustrated in FIG. 3. The magnets 41b and 42b are attached to the downshift (inward) operating lever 32, while the magnets 43b and 44b are attached to the upshift (outward) operating lever 33.

The magnetic sensors 41a and 42a are disposed on the first printed circuit board at different radial distance with respect to the pivot axis P. The magnets 41b and 42b are attached to the downshift (inward) operating lever 32 at different radial distance with respect to the pivot axis P and at different angular orientations with respect to the pivot axis P. Similarly, the magnetic sensors 43a and 44a are disposed on the second printed circuit board at different radial distance with respect to the pivot axis P. The magnets 43b and 44b are attached to the upshift (outward) operating lever 33 at different radial distance with respect to the pivot axis P and at different angular orientations with respect to the pivot axis P.

In this embodiment, the operating levers 32 and 33 are pivotally attached to the shifter housing 30 such that the operating levers 32 and 33 are each moved a first stroke length to perform a single shifting operation and each moved a second stroke length to perform a synchronized shifting operation. In other words, each of the operating levers 32 and 33 shifts the transmission (e.g., the front derailleur 16 moves the chain 22) by one front gear when moved the first stroke length (i.e., the amount of angular movement), and shifts the transmission (e.g., the front and rear derailleurs 16 and 18 both move the chain 22) by one front gear and at least one rear gear when moved the second stroke length (i.e., the amount of angular movement).

The operating levers 32 and 33 of the left hand side shifter 12 (e.g., a first gearshift operating device) constitutes a first single rider gear input member that is selectively operable in a first operation manner (e.g., a short stroke length) that produces a first gear selection signal for performing a single shifting operation and that is selectively operable in a second operation manner (e.g., a long stroke length) that produces a first/second gear selection signal for performing a synchronized shifting operation.

When the operating lever 32 is moved the first stroke length from the rest position, the magnets 41b activates the magnetic sensor 41a to output a front downshift selection signal, which is sent to the main control unit 20 via the first signal wire conductor F-D/S. The main control unit 20 then outputs a front gearshift signal to the front derailleur 16 for downshifting to a lower speed by changing one gear at a time. When the operating lever 32 is moved the second stroke length from the rest position, the magnets 41b first activates the magnetic sensor 41a to output the front downshift selection signal, which is sent to the main control unit 20 via the first signal wire conductor F-D/S, and then the magnets 42b activates the magnetic sensor 42a to output a rear upshift selection signal, which is sent to the main control unit 20 via the second signal wire conductor R-U/S. The main control unit 20 then outputs both the front gearshift signal to the front derailleur 16 for downshifting to a lower speed by changing one gear at a time and the rear gearshift signal to the rear derailleur 18 for upshifting to a higher speed by changing one gear at a time.

When the operating lever 33 is moved the first stroke length from the rest position, the magnets 43b activates the magnetic sensor 43a to output a front upshift selection signal, which is sent to the main control unit 20 via the first signal wire conductor F-U/S. The main control unit 20 then outputs a front gearshift signal to the front derailleur 16 for upshifting to a higher speed by changing one gear at a time. When the operating lever 33 is moved the second stroke length from the rest position, the magnets 43b first activates the magnetic sensor 43a to output the front upshift selection signal, which is sent to the main control unit 20 via the first signal wire conductor F-U/S, and then the magnets 44b activates the magnetic sensor 44a to output a rear downshift selection signal, which is sent to the main control unit 20 via the second signal wire conductor R-D/S. The main control unit 20 then outputs both the front gearshift signal to the front derailleur 16 for upshifting to a higher speed by changing one gear at a time and the rear gearshift signal to the rear derailleur 18 for downshifting to a lower speed by changing one gear at a time.

Returning back to FIG. 3, in this first embodiment, the right hand side shifter 14 is preferably provided with two shift switches that produce shift control signals for only operating the rear derailleur 18. In particular, the right hand side shifter 14 is includes a rear derailleur downshift switch 51 and a rear derailleur upshift switch 52. Preferably, the shift switches 51 and 52 are contactless switches similar to the shift switches 41 and 43. In other words, each of the shift switches 51 and 52 includes a magnetic sensor (not shown) disposed on a printed circuit board that is rigidly attached to the inside of the housing of the right hand side shifter 14, and a magnet (not shown) attached to one of the operating levers 36 and 37. The downshift (inward) operating lever 36 and the upshift (outward) operating lever 37 of the right hand side shifter 14 are preferably trigger levers that returns to a rest position after being moved to an operating position for performing a shifting operation. Since any type of shifter can be used for the right hand side shifter 14, the details of the right hand side shifter 14 will not be discussed and/or illustrated in more detail herein. The right hand side shifter 14 constitutes a second gearshift operating device that is a physically separate from the left hand side shifter 12 (e.g., the first gearshift operating device) with the right hand side shifter 14 (e.g., the second gearshift operating device) having the operating levers 36 and 37 that constitute rider gear input members for producing rear gear selection signals.

As diagrammatically illustrated in FIG. 3, preferably, the front derailleur 16 includes a motor 70, a motor driver 72, a voltage sensor 74, a FD microcomputer 76 and an operating position sensor 78. The motor 70 is a reversible motor that drives the front derailleur 16 (i.e., the move the chain guide of the front derailleur 16 laterally with respect to the frame 24). The motor driver 72 drives the motor 70 in response to control signals from the FD microcomputer 76. The motor driver 72 includes motor drivers and deceleration units for driving and decelerating the rotation of the motor 70. The FD microcomputer 76 is configured and arranged to control the motor driver 72 in response to a shift signal from the shifter 12 via the main control unit 20. The FD microcomputer 76 includes control circuits with CPUs, units, computation units, and the like. The FD microcomputer 76 also includes software that controls the motor 70 in accordance with shift signals outputted from the shifter 12. The voltage sensor 74 detects the voltage level or power level of the electricity being supplied to the motor 70 from the power supply 26. The position sensor 78 is configured and arranged to control and sense the gearshift position of the front derailleur 16 with respect to the front sprockets F1 and F2. The position sensor 78 is a sensor that uses rotary encoders or the like, for example, to sense the shifted positions of the front derailleur 16. Of course, it will be apparent from this disclosure that other types of position sensing arrangements can be used.

Similarly, the rear derailleur 18 preferably includes a motor 80, a motor driver 82, a voltage sensor 84, a RD microcomputer 86 and an operating position sensor 88. The motor 80 is a reversible motor that drives the rear derailleur 18 (i.e., the move the chain guide of the rear derailleur 18 laterally with respect to the frame 24). The motor driver 82 drives the motor 80 in response to control signals from the RD microcomputer 86. The motor driver 82 includes motor drivers and deceleration units for driving and decelerating the rotation of the motor 80. The RD microcomputer 86 is configured and arranged to control the motor driver 82 in response to a shift signal from the shifter 14 via the main control unit 20. The RD microcomputer 86 includes control circuits with CPUs, storage units, computation units, and the like. The RD microcomputer 86 also includes software that controls the motor 80 in accordance with shift signals outputted from the shifter 14. The voltage sensor 84 detects the voltage level or power level of the electricity being supplied to the motor 80 from the power supply 26. Normally, the voltage sensor 84 is not used unless power is cut off to the front derailleur 16. Rather, the detection result by the voltage sensor 74 is normally sent to the RD microcomputer 86. However, if the RD microcomputer 86 does not receive the detection result from the voltage sensor 74, then the RD microcomputer 86 determines that the voltage sensor 84 is broken. Thus, if the voltage sensor 84 is broken, then the detection result from the voltage sensor 84 is transmitted to the main control unit 20 and the FD microcomputer 76. The position sensor 88 is configured and arranged to control and sense the gearshift position of the rear derailleur 18 with respect to the rear sprockets R1 to R10. The position sensor 88 is a sensor that uses rotary encoders or the like, for example, to sense the shifted positions of the rear derailleur 18. Of course, it will be apparent from this disclosure that other types of position sensing arrangements can be used.

The parts of the derailleurs 16 and 18, the shifters 12 and 14, the main control unit 20 and the display unit 28 are supplied with electrical power from the power supply 26 mounted on the frame 24, as shown in FIG. 1. Specifically, the power supply 26 has a power supply line 90 and a ground line 91 that are electrically coupled to the derailleurs 16 and 18 and the main control unit 20. The electrically power is also supplied to the shifters 12 and 14 and the display unit 28 from the main control unit 20 via the ground wire conductors GND and the power wire conductors V. A power supply voltage (V) of about 6 to 8.4 volts (DC) is preferably supplied to these components.

Furthermore, the gearshift position signals POS of the front and rear position sensors 78 and 88 are output to the main control unit 20 via a position signal line 93. In the main control unit 20, the gearshift position signals POS are converted into display signals, and the gearshift positions of the front and rear derailleurs 16 and 18 are displayed by the display unit 28. Voltage data (VD: e.g., three stages of voltage data) is also output to the position signal line 93. Furthermore, the gearshift signals U/S (upshift) and D/S (downshift) are output from the main control unit 20 in accordance with the operation of the shift switches 41 to 44, 51 and 52 of the shifters 12 and 14 to the front and rear derailleurs 16 and 18 by the respective gearshift signal lines 94 and 95. In actual practice, the gearshift signal line 95 of the gearshift signal RDS is connected to the rear derailleur 18 via the front derailleur 16 or a branched junction terminal on the respective gearshift signal lines 94. Accordingly, the front derailleur 16 is connected to the main control unit 20 via five-core wiring, e.g., via the down tube, and the rear derailleur 18 is connected to the front derailleur 16 or the branched junction terminal via four-core wiring, e.g., via the chain stay. Accordingly, a connector that connects all of the five-core wiring can be disposed in the front derailleur 16.

The main control unit 20 is operatively disposed between the shifters 12 and 14 (e.g., the first and second gearshift operating devices) and the front and rear derailleurs 16 and 18 (e.g., the first and second gear shifting devices) with the main control unit 20 receiving the front (first) and rear (second) gear selection signals from the shifters 12 and 14 (e.g., the first and second gearshift operating devices), respectively, and transmitting the front (first) and rear (second) gearshift signals to the first and second microcomputers 76 and 86 of the front and rear derailleurs 16 and 18, respectively.

The main control unit 20 includes a microcomputer 96 that cooperates with the microcomputers 76 and 86 of the front and rear derailleurs 16 and 18 to control the shifting of the front and rear derailleurs 16 and 18. The microcomputer 96 of includes other a central processing unit (CPU) and other conventional components such as an input interface circuit, an output interface circuit, and storage devices such as a ROM (Read Only Memory) device and a RAM (Random Access Memory) device. The microcomputer 96 with a manual shift control program. The manual shift control program provides for manually shifting the front and rear derailleurs 16 and 18 via the shifters 12 and 14. It is possible the microcomputer 96 also has an auto-shift control program. The auto-shift control program provides for automatically controlling the shifting the front and rear derailleurs 16 and 18 when an automatic shifting mode is selected. It will be apparent to those skilled in the art from this disclosure that the precise structure and algorithms for the main control unit 20 can be any combination of hardware and software that will carry out the functions of the present invention.

As diagrammatically illustrated in FIG. 3, the main control unit 20 is preferably configured to include a gear selection signal receiving section, a gearshift determination section, a gearshift output section and a front finished shifting determination section. The gear selection signal receiving section of the main control unit 20 selectively receives a first gear selection signal and a first/second gear selection signal. In the first illustrated embodiment, the gear selection signals are electrical pulses that are sent from the shift switches 41 to 44, 51 and 52, the first gear selection signal being a gear selection signal that is indicative of a single shift operation and the first/second gear selection signal being a gear selection signal that is indicative of a synchro gearshift operation.

The gearshift determination section of the main control unit 20 determines a first rider shift intention for first gear shifting when the first gear selection signal is received by the gear selection signal receiving section, which meets a first signal criteria. In the first illustrated embodiment, the first rider shift intention is determined to have been met by the gearshift determination section of the main control unit 20 when the first gear selection signal is received via a first input (e.g., either line F-D/S or line F-U/S from the left hand side shifter 12) of the gear selection signal receiving section of the main control unit 20. The gearshift determination section of the main control unit 20 determines a second rider shift intention for performing second gear shifting in addition to the first shifting when the first/second gear selection signal is received by the gear selection signal receiving section, which meets a second signal criteria that is different from the first signal criteria. In the first illustrated embodiment, the second rider shift intention is determined to have been met by the gearshift determination section of the main control unit 20 when the first/second gear selection signal is received via a second input (e.g., either line R-D/S or line R-U/S from the left hand side shifter 12) of the gear selection signal receiving section of the main control unit 20. The gearshift determination section of the main control unit 20 determines a third rider shift intention for performing third gear shifting when a third gear selection signal is received by the gear selection signal receiving section, which meets a third signal criteria. In the first illustrated embodiment, the third rider shift intention is determined to have been met by the gearshift determination section of the main control unit 20 when the third gear selection signal is received via the first input (e.g., either line F-D/S or line F-U/S from the left hand side shifter 12) of the gear selection signal receiving section of the main control unit 20. The gearshift determination section of the main control unit 20 determines a fourth rider shift intention for performing fourth gear shifting in addition to the third shifting when the third/fourth gear selection signal is received by the gear selection signal receiving section, which meets a fourth signal criteria that is different from the third signal criteria. In the first illustrated embodiment, the fourth rider shift intention is determined to have been met by the gearshift determination section of the main control unit 20 when the third/fourth gear selection signal is received via the second input (e.g., either line R-D/S or line R-U/S from the left hand side shifter 12) of the gear selection signal receiving section of the main control unit 20.

The gear shift output section of the main control unit 20 outputs a first or third gearshift signal to the FD microcomputer 76 upon the gearshift determination section determining the first rider shift intention, the second rider shift intention, the third rider shift intention or the fourth rider shift intention exists, and outputs a second or fourth (synchro) gearshift signal to the RD microcomputer 86 upon the gearshift determination section determining that the second or fourth rider shift intention. When the downshift operating lever 32 is moved to the second shift position (second stroke length), the gear shift output section of the main control unit 20 outputs the first gearshift signal to the FD microcomputer 76 for downshifting the front derailleur 16 to a lower speed by changing one gear at a time, and outputs the second gearshift signal to the RD microcomputer 86 for upshifting the rear derailleur 18 to a higher speed by one or a prescribed number of gear changed at a time. When the upshift operating lever 33 is moved to the second shift position (second stroke length), the gear shift output section of the main control unit 20 outputs the first gearshift signal to the FD microcomputer 76 for upshifting the to a higher speed by changing one gear at a time, and outputs the second gearshift signal for downshifting to the RD microcomputer 86 to a lower speed by one or a prescribed number of gear changed at a time.

Thus, in the illustrated embodiment, the front derailleur 16 constitutes a first gear shifting device that is operated by the left hand side shifter 12 (e.g., the first gearshift operating device) in response to the operating lever 32 or the operating lever 33 being operated in the first and second operation manners (e.g., short or long stroke lengths). Also in the illustrated embodiment, the rear derailleur 18 constitutes a second gear shifting device that is operated by the left hand side shifter 12 (e.g., the first gearshift operating device) in response to the operating lever 32 or the operating lever 33 being operated in the second operation manners (e.g., short or long stroke lengths).

The microcomputer 96 of the main control unit 20 and the microcomputers 76 and 86 of the front and rear derailleurs 16 and 18 together constitute a bicycle shifting controller of the bicycle shifting control apparatus. In other words, the bicycle shifting controller includes the FD microcomputer 76 as a first microcomputer that is associated with the front derailleur 16 (e.g., the first gear shifting device) and the RD microcomputer 86 as a second microcomputer associated with the rear derailleur 18 (e.g., the second gear shifting device). The bicycle shifting controller of the bicycle shifting control apparatus is operatively coupled to the voltage sensors 74 and 84 (e.g., the power supply sensors) to receive a power level signal from the voltage sensors 34 and 44, in which the power level signal is indicative of a current power (voltage) lever of the power supply 26. The detection results of the voltage sensors 34 and 44 are sent to each of the microcomputer 96 of the main control unit 20 and the microcomputers 76 and 86 of the front and rear derailleurs 16 and 18. However, normally, only the detection results of one of the voltage sensors 34 and 44 is used or sent at a time as discussed above.

While three separate microcomputers are used to form the bicycle shifting controller of the bicycle shifting control apparatus in this illustrated embodiment, fewer or more microcomputers can be utilized as needed and or desired. In other words, the microcomputers 76 and 86 of the front and rear derailleurs 16 and 18 can be eliminated and their functions and operations can be combined into the microcomputer of the main control unit 20 as needed and/or desired.

Referring now to the flow chart of FIG. 9, the processing executed by the bicycle shifting controller (i.e., the main control unit 20, the FD microcomputer 76 and the RD microcomputer 86) will now be discussed. When the main control unit 20 is turned "on", the electrical power from the battery 26 is supplied to the shifters 12 and 14 and the front and rear derailleurs 16 and 18.

Figure 9:
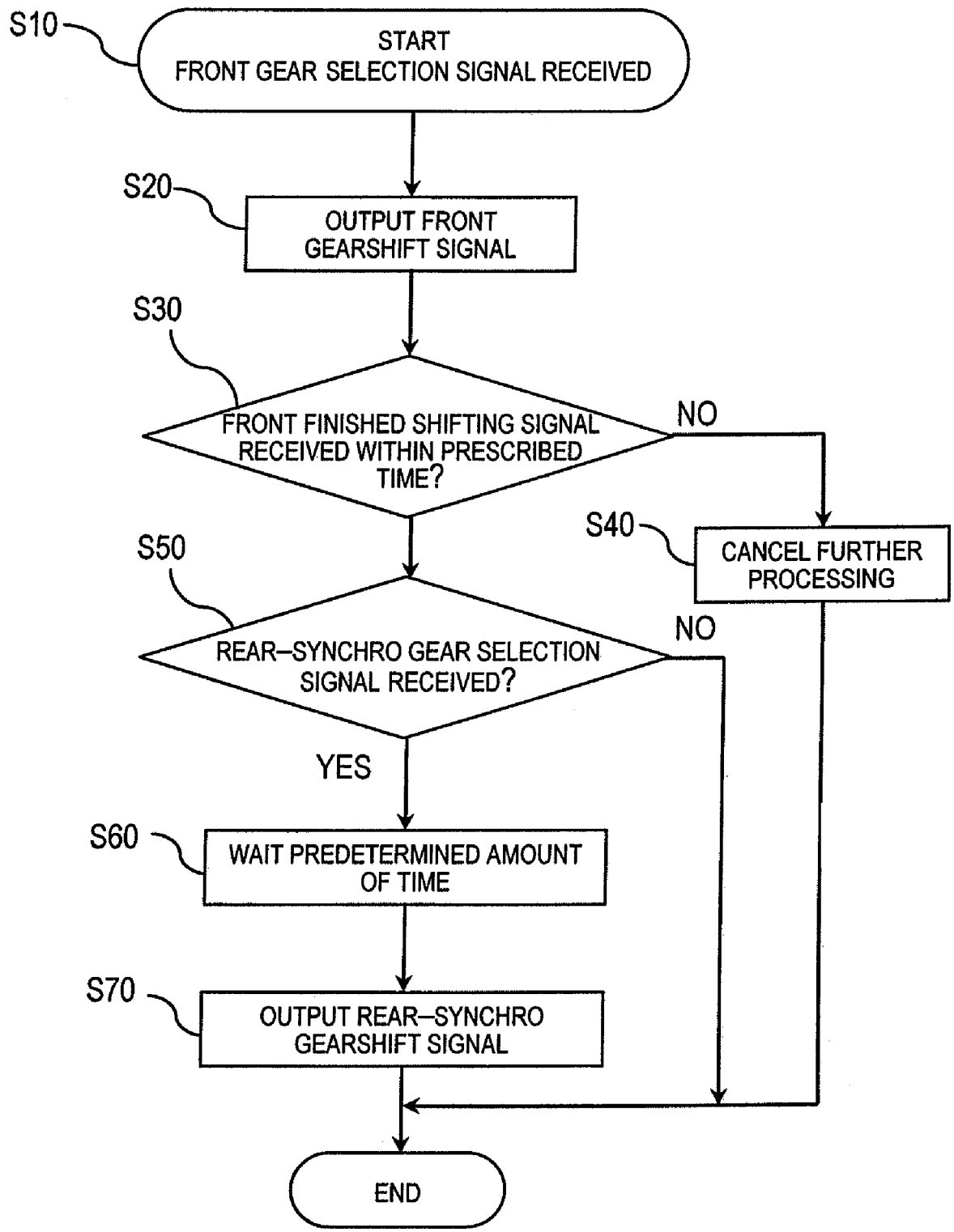
FIG. 9 is a flowchart showing a first control processing executed by the controller of the bicycle shifting control apparatus for the first embodiment.

In step S10, the process of the flow chart of FIG. 9 starts when the main control unit 20 receives a front gear selection signal from one of the shift switches 41 and 43 of the left hand side shifter 12. More specifically, when the downshift (inward) operating lever 32 is pushed (short push or stroke) such that the magnet 41b is disposed over the magnetic sensor 41a, the front derailleur downshift switch 41 outputs a front gear selection signal to the main control unit 20 for moving the front derailleur 16 to shift the chain 22 from the from the small front sprocket F1 to the large front sprocket F2. On the other hand, when the upshift (outward) operating lever 33 is pushed (short push or stroke) such that the magnet 43b is disposed over the magnetic sensor 43a, the front derailleur upshift switch 43 outputs a front gear selection signal to the main control unit 20 for moving the front derailleur 16 to shift the chain 22 from the from the large front sprocket F2 to the small front sprocket F1.

In step S20, the main control unit 20 outputs a front gearshift signal (front shifting command signal) to the FD microcomputer 76 of the front derailleur 16. The FD microcomputer 76 then determines a current front gear position of the front derailleur 16 (i.e., determines if the chain guide of the front derailleur 16 is over the front sprocket F1 or the front sprocket F2). In the illustrated embodiment, the operating position sensor 78 of the front derailleur 16 provides the FD microcomputer 76 with the current front gear position of the front derailleur 16. In response to this front gearshift signal (front shifting command signal) and based on a stored gear position from the operating position sensor 78, the FD microcomputer 76 determines whether or not to operate the FD motor 70 to move the gear position of the chain guide of the front derailleur 16. If the FD microcomputer 76 determines that the chain guide of the front derailleur 16 should not be shifted, then the FD microcomputer 76 does not move the FD motor 70 and does not output a front finished shifting signal to the main control unit 20. However, if the FD microcomputer 76 determines that the chain guide of the front derailleur 16 can be shifted, then the FD microcomputer 76 moves the FD motor 70 and outputs a front finished shifting signal to the main control unit 20. The determination of whether or not to output a front finished shifting signal can be accomplished in other ways. For example, alternatively, the FD microcomputer 76 can determinate whether or not to output a front finished shifting signal based on whether the chain guide of the front derailleur 16 moves when the FD motor 70 is driven.

In step S30, the main control unit 20 of the bicycle shifting controller determines if the front finished shifting signal is received from the FD microcomputer 76 of the front derailleur 16 within a prescribed time (e.g., one or two seconds). If the front finished shifting signal is not received within the prescribed time, then the process proceeds to step S40, where further processing of any signal from the rear derailleur upshift switch 42 or the rear derailleur downshift switch 44 is canceled. On the other hand, if the front finished shifting signal is received within the prescribed time, then the process proceeds to step S50.

In step S50, the main control unit 20 of the bicycle shifting controller determines if a rear-synchro gear selection signal is received from either the rear derailleur upshift switch 42 or the rear derailleur downshift switch 44. If a rear-synchro gear selection signal has not been received by the main control unit 20 of the bicycle shifting controller, then the process ends. If a rear-synchro gear selection signal has been received by the main control unit 20 of the bicycle shifting controller, then the process proceeds to step S60.

In step S60, the main control unit 20 waits predetermined amount of time before proceeding to step S70. Step S60 may not be necessary in certain circumstances. For example, if the prescribed time in step S30 is sufficient to ensure that the shifting of the front derailleur 16 is completed by the time the processing proceeds to step S70, then step S60 can be eliminated. Moreover, step S50 may include a prescribed amount of time to elapse before determining if a rear-synchro gear selection signal is received by the main control unit 20 of the bicycle shifting controller. If step S50 includes a wait time before making the decision, then step S60 can be eliminated.

In step S70, the rear-synchro gearshift signal is output from the main control unit 20 of the bicycle shifting controller to the rear derailleur 18. Upon receiving the rear-synchro gear selection signal from the main control unit 20, the RD microcomputer 86 then determines a current rear gear position of the rear derailleur 18 (i.e., determines the position of the chain guide of the rear derailleur 18 with respect to the rear sprockets R1 to R10). In the illustrated embodiment, the operating position sensor 88 of the rear derailleur 18 provides the RD microcomputer 86 with the current rear gear position of the rear derailleur 18. In response to this rear-synchro gearshift signal (rear shifting command signal) and based on a stored gear position from the operating position sensor 88, the RD microcomputer 86 determines whether or not to operate the RD motor 80 to move the gear position of the chain guide of the rear derailleur 18. If the RD microcomputer 86 determines that the chain guide of the rear derailleur 18 should not be shifted, then the RD microcomputer 86 does not move the RD motor 80. However, if the RD microcomputer 86 determines that the chain guide of the rear derailleur 18 can be shifted, then the RD microcomputer 86 moves the RD motor 80.

When the chain 22 is positioned on the large (outer) front sprocket F2 (Top gear), and if the rider pushes the downshift (inward) operating lever 32 to the first position ($1^{st}$ click), then only the front derailleur 16 is shifted from the large (outer) front sprocket F2 to the small (inner) front sprocket F1, and the rear derailleur 18 does not move. However, when the chain 22 is positioned on the small (inner) front sprocket F1 (Low gear), and if the rider pushes the downshift (inward) operating lever 32 to the first portion ($1^{st}$ click), then both the front and rear derailleurs 16 and 18 do not move.

When the chain 22 is positioned on the large (outer) front sprocket F2 (Top gear), and if the rider push the downshift (inward) operating lever 32 to the second position ($2^{nd}$ click), then both the front and rear derailleurs 16 and 18 are shifted. Specifically, the front derailleur 16 is shifted from the large (outer) front sprocket F2 to the small (inner) front sprocket F1, and the rear derailleur 18 is shifted (for example, upshifted one or two gears) to decrease the gear ratio. This upshift value (i.e., the number of gears shifted in response to the rear-synchro gear selection signal) is preferably adjustable by the rider changing a setting in the main control unit 20. However, when the chain 22 is positioned on the small (inner) front sprocket F1 (Low gear), and if the rider pushes the downshift (inward) operating lever 32 to the second position ($2^{nd}$ click), then both the front and rear derailleurs 16 and 18 do not move.

When the chain 22 is positioned on the small (inner) front sprocket F1 (Low gear), and if the rider pushes the upshift (outward) operating lever 33 to the first position ($1^{st}$ click), then only the front derailleur 16 is shifted from the small (inner) front sprocket F1 to the large (outer) front sprocket F2, and the rear derailleur 18 does not move. However, when the chain 22 is positioned on the large (outer) front sprocket F2, and if the rider pushes the upshift (outward) operating lever 33 to the first portion ($1^{st}$ click), then both the front and rear derailleurs 16 and 18 do not move.

When the chain 22 is positioned on the small (inner) front sprocket F1 (Low gear), and if the rider push the upshift (outward) operating lever 33 to the second position ($2^{nd}$ click), then both the front and rear derailleurs 16 and 18 are shifted. Specifically, the front derailleur 16 is shifted from the small (inner) front sprocket F1 the large (outer) front sprocket F2, and the rear derailleur 18 is shifted (for example, downshifted one or two gears) to increase the gear ratio. This downshift value (i.e., the number of gears shifted in response to the rear-synchro gear selection signal) is preferably adjustable by the rider changing a setting in the main control unit 20. The downshift value is independently adjustable with respect to the upshift value such that the rider can set the downshift value and the upshift value to be the same or different for rear-synchro shifting. However, when the chain 22 is positioned on the large (outer) front sprocket F2 (Top gear), and if the rider pushes the upshift (outward) operating lever 33 to the second position ($2^{nd}$ click), then both the front and rear derailleurs 16 and 18 do not move.

Referring now to the flow chart of FIG. 10, an alternate processing executed by the bicycle shifting controller (i.e., the main control unit 20, the FD microcomputer 76 and the RD microcomputer 86) will now be discussed. Since some of the steps of the processing illustrated in FIG. 9 are used in the alternate processing illustrated in FIG. 10, the identical processing steps will be given the same reference symbol.

Figure 10:
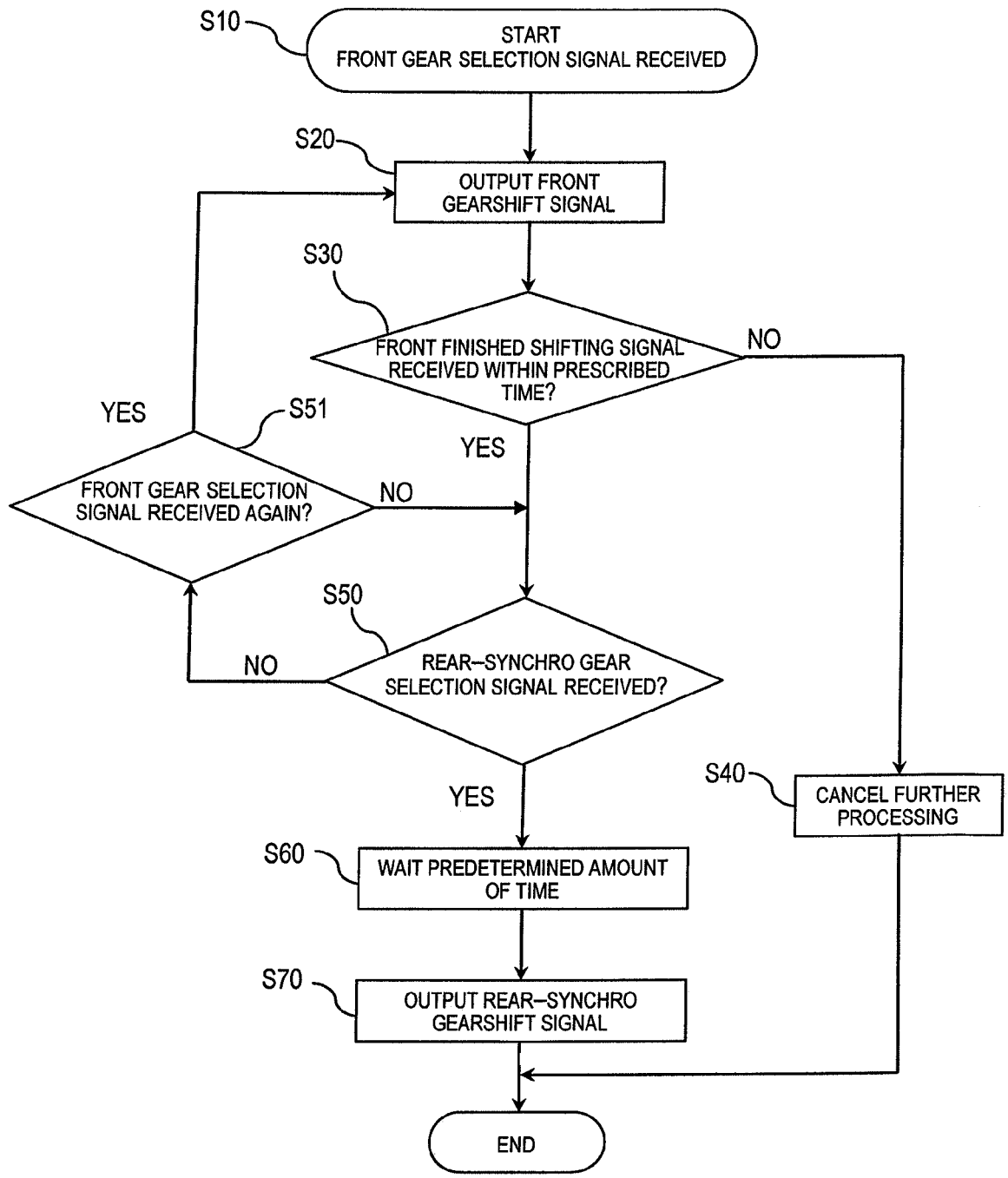
FIG. 10 is a flowchart showing an alternative control processing executed by the controller of the bicycle shifting control apparatus for the first embodiment.

In the processing illustrated in FIG. 10, when the main control unit 20 is turned "on", the electrical power from the battery 26 is supplied to the shifters 12 and 14 and the front and rear derailleurs 16 and 18. In step S10, the process of the flow chart of FIG. 10 starts when the main control unit 20 receives a front gear selection signal from one of the shift switches 41 and 43 of the left hand side shifter 12 in the same manner as the process of the flow chart of FIG. 9. In fact, the process of the steps S10, S20, S30, S40, S50, S60 and S70 of the flow chart of FIG. 10 are the same as the steps S10, S20, S30, S40, S50, S60 and S70 of the flow chart of FIG. 9. Thus, the description of these steps will not be repeated.

The process of the flow chart of FIG. 10 differs from that of the flow chart of FIG. 9 in that step S51 has been added such that the processing is not immediately end when the rear-synchro gear selection signal has not been received. Rather, if the rear-synchro gear selection signal has not been received, then the process proceeds to step S51.

In step S51, the main control unit 20 of the bicycle shifting controller determines if a front gearshift signal has been received again. If yes, then the process proceeds back to step S20. If no, then the process proceeds back to step S50.

Referring now to the flow chart of FIG. 11, an alternate processing executed by the bicycle shifting controller (i.e., the main control unit 20, the FD microcomputer 76 and the RD microcomputer 86) will now be discussed. Since some of the steps of the processing illustrated in FIG. 9 are used in the alternate processing illustrated in FIG. 11, the identical processing steps will be given the same reference symbol.

Figure 11:
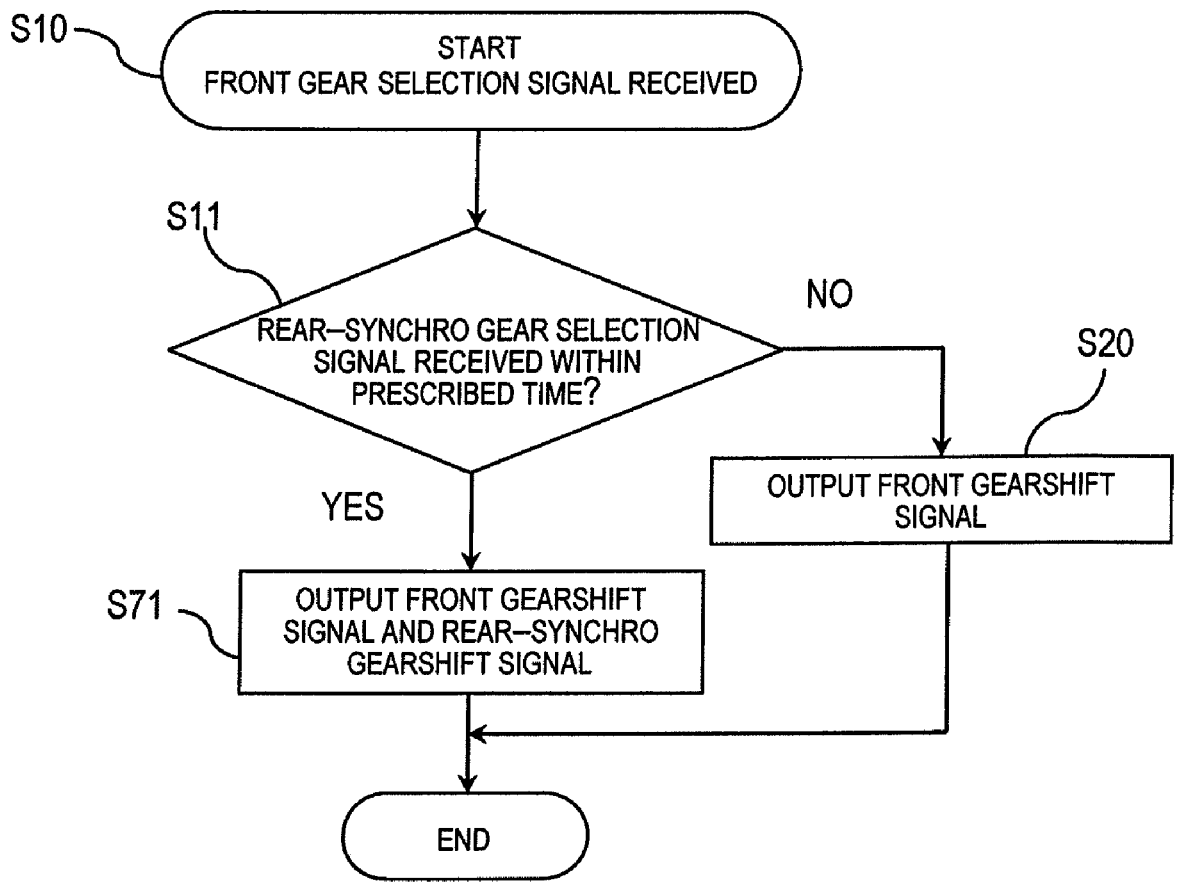
FIG. 11 is a flowchart showing an another alternative control processing executed by the controller of the bicycle shifting control apparatus for the first embodiment.

In the processing illustrated in FIG. 11, when the main control unit 20 is turned "on", the electrical power from the battery 26 is supplied to the shifters 12 and 14 and the front and rear derailleurs 16 and 18. In step S10, the process of the flow chart of FIG. 11 starts when the main control unit 20 receives a front gear selection signal from one of the shift switches 41 and 43 of the left hand side shifter 12 in the same manner as the process of the flow chart of FIG. 9.

In step S11, the main control unit 20 of the bicycle shifting controller determines if a rear-synchro gear selection signal is not received within prescribed time (e.g., one or two seconds). If no, then the process proceeds to step S20, where the main control unit 20 outputs the front gearshift signal. If yes, then the process proceeds back to step S71, where the main control unit 20 outputs both the front gearshift signal and the rear-synchro gearshift signal.

Regarding step S71, the main control unit 20 can selectively output the front gearshift signal and the rear-synchro gearshift signal at the same time, or first output the front gearshift signal and then output the rear-synchro gearshift signal, or first output the rear-synchro gearshift signal and then output the front gearshift signal. Depending on the current position of the chain 22 on the front and rear sprockets, it can be more preferably to the front derailleur 16 and then the rear derailleur 18 or vice-a-versa. For example, when downshifting (operating the downshift operating lever 32), it is preferred to first downshift the front derailleur 16 and then upshift the rear derailleur 18. On the other hand, when upshifting (operating the upshift operating lever 33), it is preferred to first downshift the rear derailleur 18 and then upshift the front derailleur 16. Thus, preferably, the main control unit 20 selectively outputs the front gearshift signal and the rear-synchro gearshift signal in different sequences depending on the current position of the chain 22 on the front and rear sprockets.

If front and rear derailleurs 16 and 18 are shifted absolutely at the same time, this would result in a shock. Therefore, start time of the front shifting and the rear shifting are preferably slightly offset in time. The user can selectively set up the offset timing between the front shifting and the rear shifting in memory of the main control unit 20. For example, an offset timing of 0.25 seconds can be set by pushing a button on the main control unit 20. Moreover, the offset timing for when the rider upshifts and offset timing for when the rider downshifts are either the same or different, as set by the rider and/or factory.

When the main control unit 20 determines a second rider intention, the main control unit 20 determines predetermined rear gear in connection with the change of the front derailleur 16. In processing of FIG. 11, after the main control unit 20 receives the front selection signal and the rear-synchro gear selection signal, the main control unit 20 outputs both of the front gearshift signal and the rear-synchro gearshift signal, and does not wait to receive the front finished shifting signal.

Referring now to the flow chart of FIG. 12, an alternate processing executed by the bicycle shifting controller (i.e., the main control unit 20, the FD microcomputer 76 and the RD microcomputer 86) will now be discussed. Since some of the steps of the processing illustrated in FIG. 9 are used in the alternate processing illustrated in FIG. 12, the identical processing steps will be given the same reference symbol.

Figure 12:
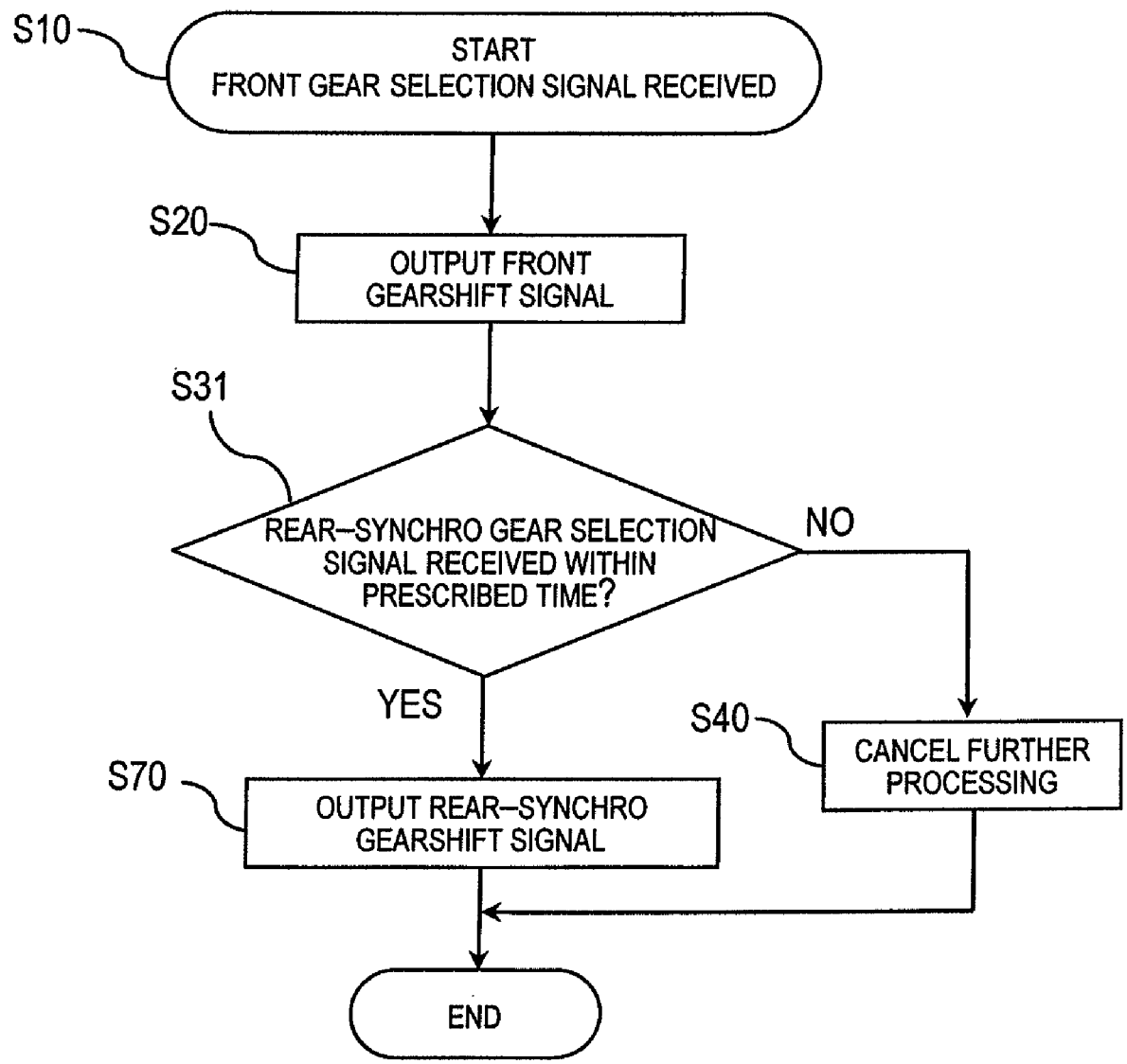
FIG. 12 is a flowchart showing an another alternative control processing executed by the controller of the bicycle shifting control apparatus for the first embodiment.

In the processing illustrated in FIG. 12, when the main control unit 20 is turned "on", the electrical power from the battery 26 is supplied to the shifters 12 and 14 and the front and rear derailleurs 16 and 18. In step S10, the process of the flow chart of FIG. 11 starts when the main control unit 20 receives a front gear selection signal from one of the shift switches 41 and 43 of the left hand side shifter 12 in the same manner as the process of the flow chart of FIG. 9.

In step S20, the main control unit 20 outputs a front gearshift signal to the FD microcomputer 76 of the front derailleur 16. Then the process proceeds to step S31.

In step S31, the main control unit 20 of the bicycle shifting controller determines if a rear-synchro gear selection signal is not received within prescribed time (e.g., one or two seconds). Step S31 is the same as step S11 of FIG. 11. If the synchro gear selection signal has not been received within prescribed time, then the process proceeds to step S40, where the main control unit 20 cancels any further processing. If the synchro gear selection signal has been received within prescribed time, then the process proceeds back to step 70, where the main control unit 20 outputs the rear-synchro gearshift signal.

When the main control unit 20 determines a second rider intention, the main control unit 20 determines predetermined rear gear in connection with the change of the front derailleur 16. In processing of FIG. 12, after the main control unit 20 receives the front selection signal and the rear-synchro gear selection signal, the main control unit 20 outputs both of the front gearshift signal and the rear-synchro gearshift signal, and does not wait to receive the front finished shifting signal.

Figure 13:
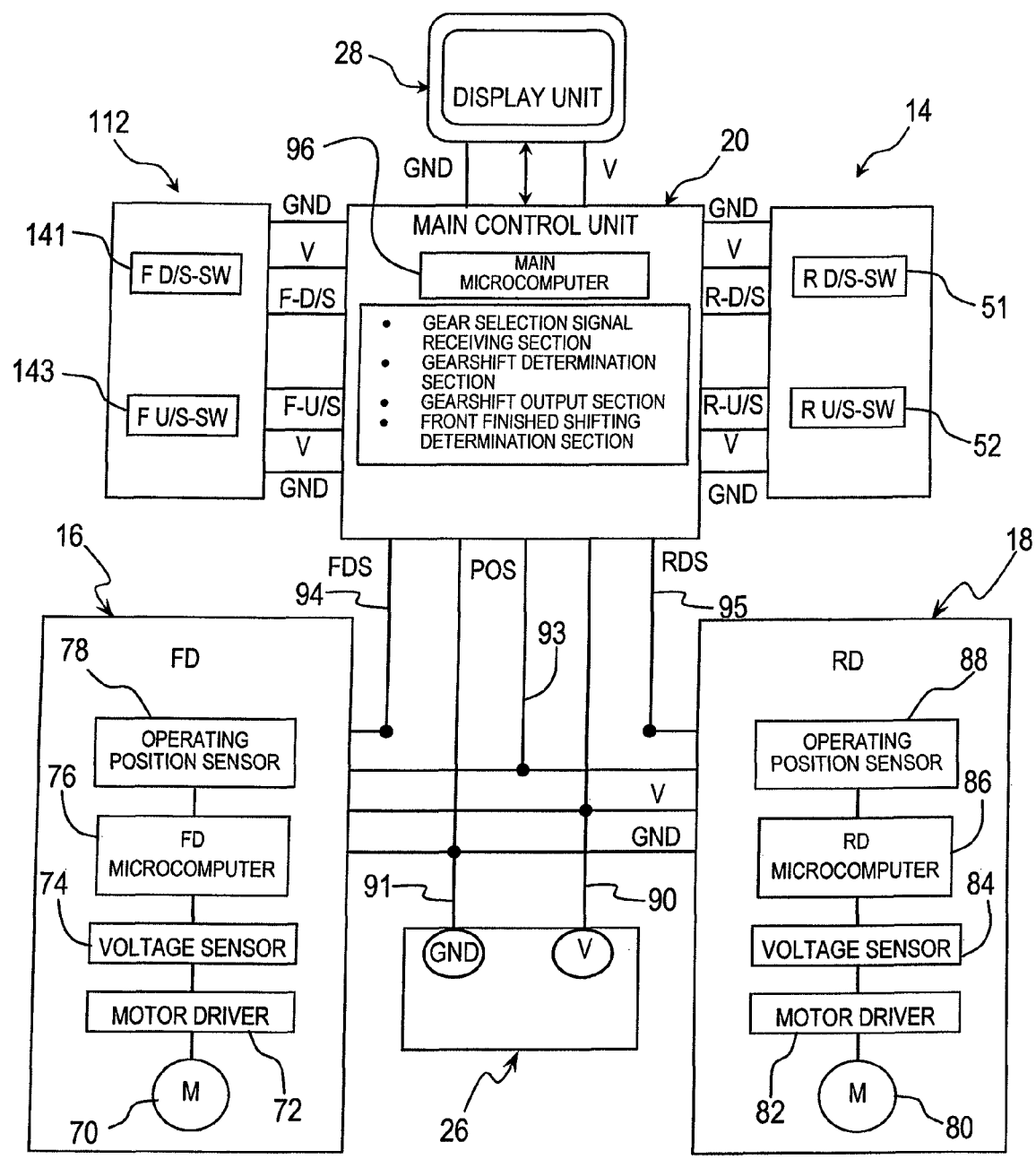
FIG. 13 is a schematic block diagram showing the entire configuration of a bicycle shifting control apparatus in accordance with a second embodiment.
Figure 14:
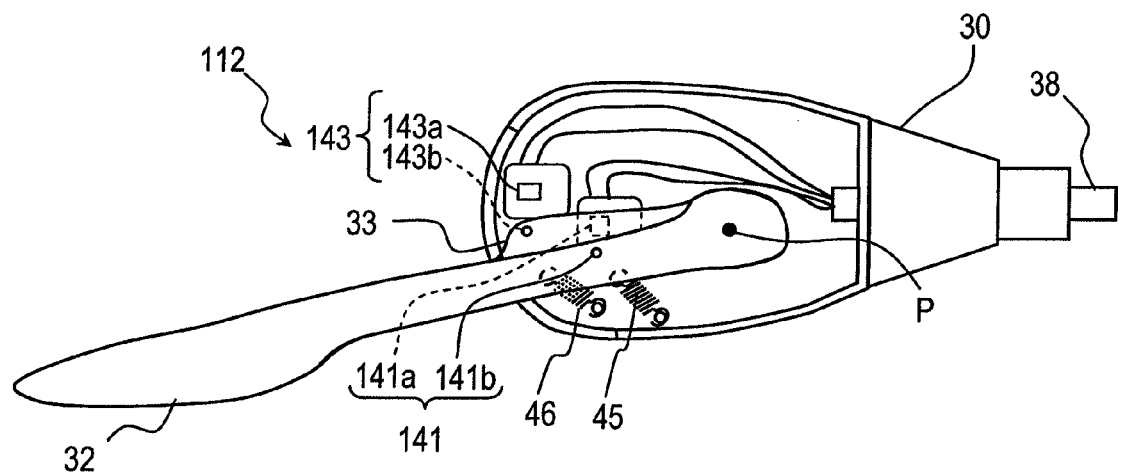
FIG. 14 is a top plan view of the left hand shifter for the second embodiment with the top cover of the housing removed to illustrate the operating levers in their rest position.
Figure 15:
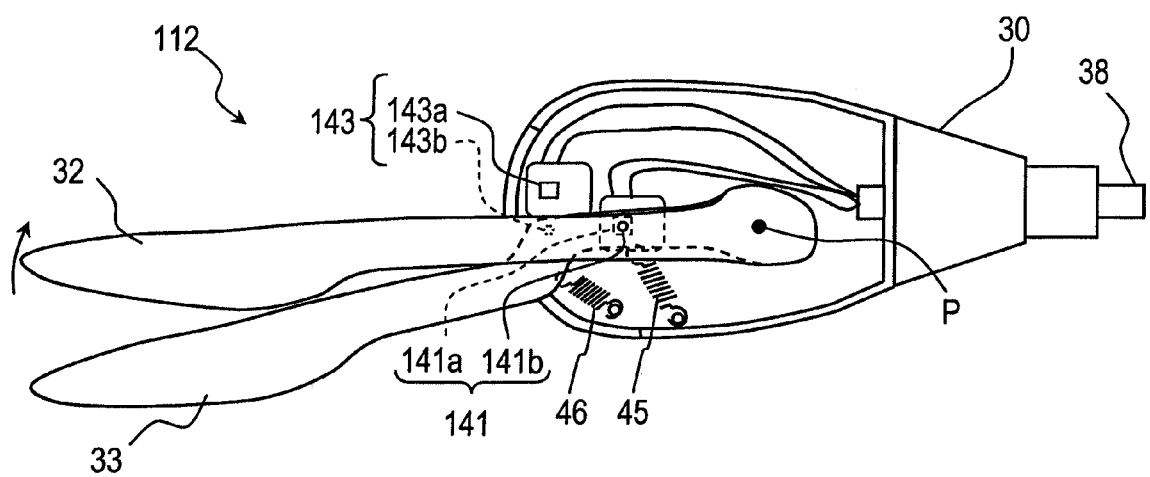
FIG. 15 is a top plan view of the left hand shifter for the second embodiment with the top cover of the housing removed to illustrate the front derailleur upshift lever in a first shift operating position for performing a single gear upshift.

Referring now to FIGS. 13 to 15, a bicycle shifting control apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In this second embodiment, a left hand side shifter 112 replaces the left hand side shifter 12 of the first embodiment and the main control unit 20 is programmed differently. The left hand side shifter 112 is identical to the left hand side shifter 12, except that the shift switches 41 to 44 have been replaced with a front derailleur downshift switch 141 and a front derailleur upshift switch 143. Here, the front derailleur downshift switch 141 is operated by the downshift (inward) operating lever 32, while the front derailleur upshift switch 143 is operated by the upshift (outward) operating lever 33. The front derailleur downshift switch 141 basically includes a magnetic sensor 141a and a magnet 141b that form a magnet sensing unit. The front derailleur upshift switch 143 basically includes a magnetic sensor 143a and a magnet 143b that form a magnet sensing unit. Of course, the shift switches 141 and 143 are not limited to magnet sensing units. For example, contact switches, optical sensors, etc. can be used as needed and/or desired.

In this second embodiment, the downshift operating lever 32 and the upshift operating lever 33 can be operated to perform both a single shifting operation and a synchronized shifting operation, similar to the first embodiment. However, in this second embodiment, the single shifting operation is performed by pushing and releasing the operating levers 32 and 33 within a prescribed time (i.e., a short push that produces a short electrical signal pulse) and the synchronized shifting operation is performed by pushing and holding the operating levers 32 and 33 for a prescribed time (i.e., a long push that produces a long electrical signal pulse). In other words, after pushing one of the operating levers 32 and 33, if rider quickly releases the operating lever 32 or 33, only the front derailleur 16 is shifted. However, if the rider pushes one of the operating levers 32 and 33 for a prescribed amount of time or more, then the front and rear derailleurs 16 and 18 are both shifted in the same manner as discussed in the first embodiment.

Referring now to the flow chart of FIG. 16, a processing executed by the bicycle shifting controller (i.e., the main control unit 20, the FD microcomputer 76 and the RD microcomputer 86) will now be discussed that uses the left hand side shifter 112 illustrated in FIGS. 13 to 15. Since some of the steps of the processing illustrated in FIG. 9 are used in the alternate processing illustrated in FIG. 16, the identical processing steps will be given the same reference symbol.

As explained below, the alternate processing illustrated in FIG. 16, the gearshift determination section of the main control unit 20 determines the first signal criteria for a single shifting operation is met when the first gear selection signal is received for an amount of time that is less than a prescribed time threshold, and the gearshift determination section of the main control unit 20 determines the second signal criteria is met for performing a synchronized shifting operation when the first gear selection signal is received for an amount of time that is equal to or greater than the prescribed time threshold such that a signal with prescribed length or longer of the first gear selection signal constitutes the first/second gearshift signal.

Figure 16:
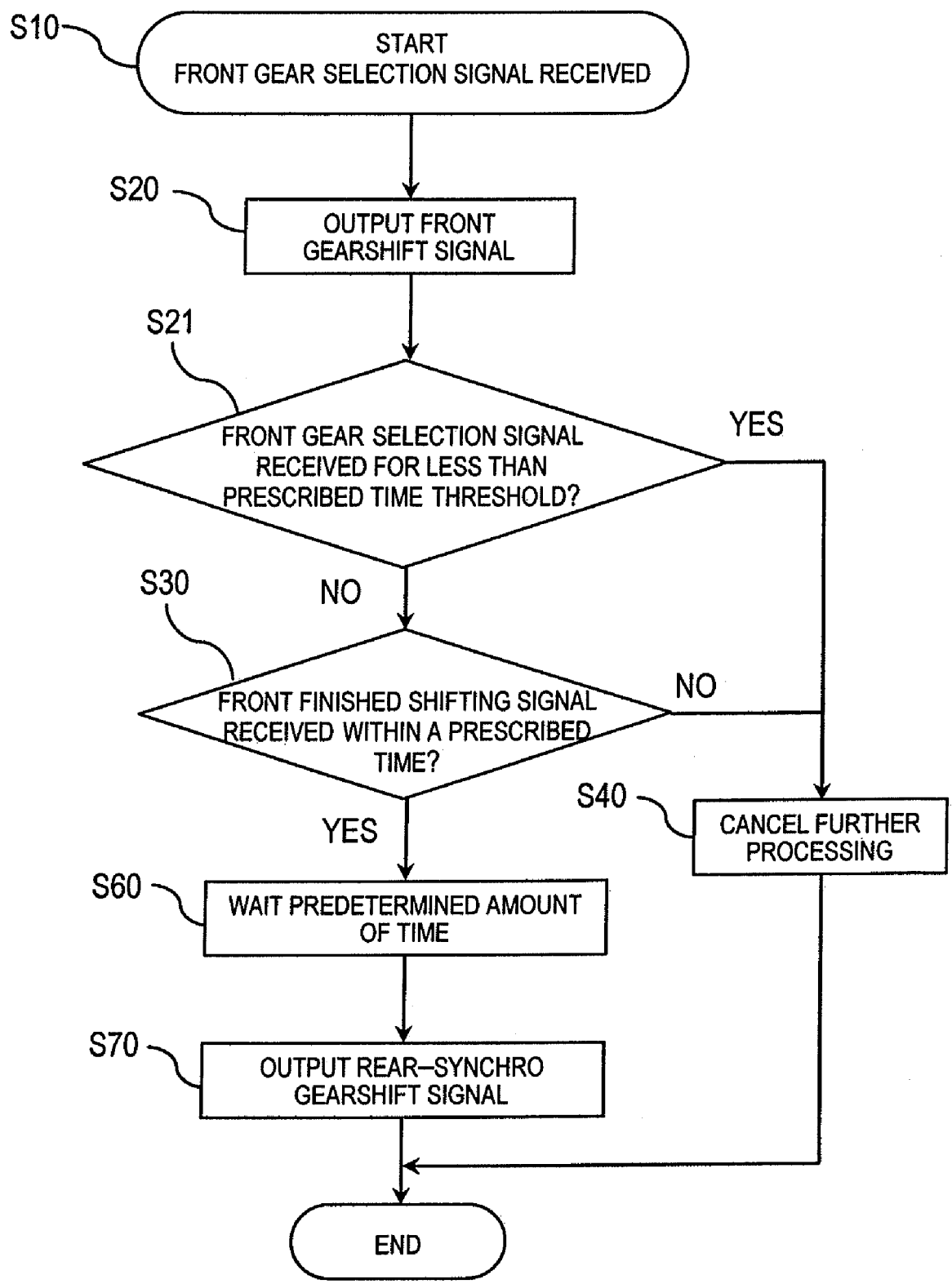
FIG. 16 is a flowchart showing a control processing executed by the controller of the bicycle shifting control apparatus for the second embodiment.

In the processing illustrated in FIG. 16, when the main control unit 20 is turned "on", the electrical power from the battery 26 is supplied to the shifters 12 and 14 and the front and rear derailleurs 16 and 18. In step S10, the process of the flow chart of FIG. 16 starts when the main control unit 20 receives a front gear selection signal from one of the shift switches 141 and 143 of the left hand side shifter 112. More specifically, when the downshift (inward) operating lever 32 is pushed quickly (short pulse) such that the magnet 141b is disposed over the magnetic sensor 141a, the front derailleur downshift switch 141 outputs a front gear selection signal to the main control unit 20 for moving the front derailleur 16 to shift the chain 22 from the from the small front sprocket F1 to the large front sprocket F2. On the other hand, when the upshift (outward) operating lever 33 is pushed quickly (short pulse) such that the magnet 143b is disposed over the magnetic sensor 143a, the front derailleur upshift switch 143 outputs a front gear selection signal to the main control unit 20 for moving the front derailleur 16 to shift the chain 22 from the from the large front sprocket F2 to the small front sprocket F1. Thus, the first gear shifting signal for performing a single shifting operation and the first/second gear shifting signal for performing a synchronized shifting operation are pulse signals with different pulse lengths.

In step S20, the main control unit 20 outputs a front gearshift signal (front shifting command signal) to the FD microcomputer 76 of the front derailleur 16 in the same manner as discussed above with respect to FIG. 9. Then the process proceeds to step S21.

In step S21, the main control unit 20 of the bicycle shifting controller determines if the front gear selection signal is received for less than a prescribed time threshold (e.g., less than 0.5 second). If the main control unit 20 determines the rider has quickly released the operating lever 32 or 33, then the process proceeds to step S40, where further processing of any signal from the shift switches 141 or 143 is canceled. However, if the main control unit 20 determines the rider has held the operating lever 32 or 33 for longer than the prescribed time threshold, then the process proceeds to step S30.

In step S30, the main control unit 20 of the bicycle shifting controller determines if the front finished shifting signal is received from the FD microcomputer 76 of the front derailleur 16 within a prescribed time (e.g., one or two seconds). If the front finished shifting signal is not received within the prescribed time, then the process proceeds to step S40, where further processing of any signal from the shift switches 141 or 143 is canceled. On the other hand, if the front finished shifting signal is received within the prescribed time, then the process proceeds to step S60.

In step S60, the main control unit 20 waits predetermined amount of time before proceeding to step S70. Step S60 may not be necessary in certain circumstances. For example, if the prescribed time in step S30 is sufficient to ensure that the shifting of the front derailleur 16 is completed by the time the processing proceeds to step S70, then step S60 can be eliminated. Moreover, step S50 can include a prescribed amount of time to elapse before determining if a rear-synchro gear selection signal is received by the main control unit 20 of the bicycle shifting controller. If step S50 includes a wait time before making the decision, then step S60 can be eliminated.

In step S70, the rear-synchro gearshift signal is output from the main control unit 20 of the bicycle shifting controller to the rear derailleur 18. Upon receiving the rear-synchro gear selection signal from the main control unit 20, the RD microcomputer 86 then determines a current rear gear position of the rear derailleur 18 (i.e., determines the position of the chain guide of the rear derailleur 18 with respect to the rear sprockets R1 to R10). In the illustrated embodiment, the operating position sensor 88 of the rear derailleur 18 provides the RD microcomputer 86 with the current rear gear position of the rear derailleur 18. In response to this rear-synchro gearshift signal (rear shifting command signal) and based on a stored gear position from the operating position sensor 88, the RD microcomputer 86 determines whether or not to operate the RD motor 80 to move the gear position of the chain guide of the rear derailleur 18. If the RD microcomputer 86 determines that the chain guide of the rear derailleur 18 should not be shifted, then the RD microcomputer 86 does not move the RD motor 80. However, if the RD microcomputer 86 determines that the chain guide of the rear derailleur 18 can be shifted, then the RD microcomputer 86 moves the RD motor 80.

Figure 17:
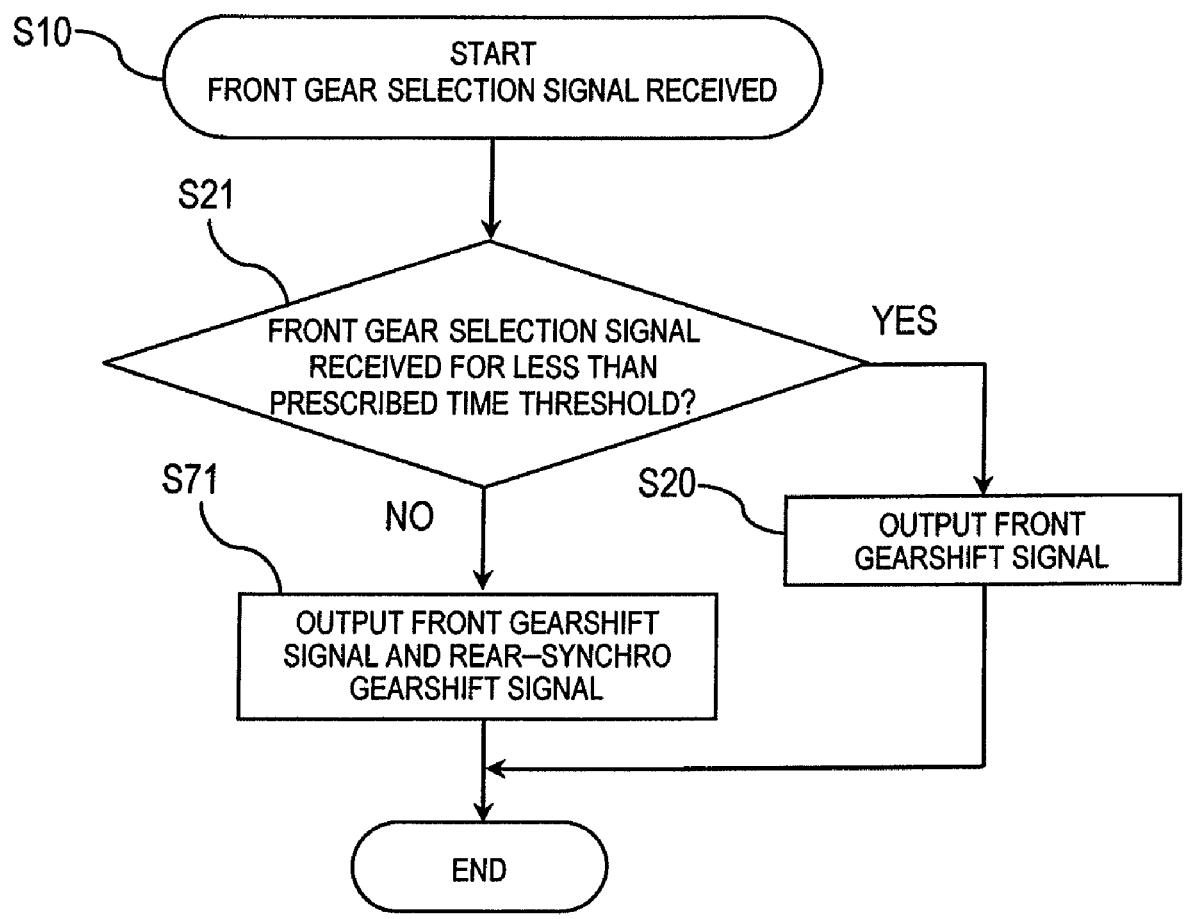
FIG. 17 is a flowchart showing a control processing executed by the controller of the bicycle shifting control apparatus for the second embodiment.

Referring now to the flow chart of FIG. 17, an alternate processing executed by the bicycle shifting controller (i.e., the main control unit 20, the FD microcomputer 76 and the RD microcomputer 86) will now be discussed that uses the left hand side shifter 112 illustrated in FIGS. 13 to 15. Basically, the flow chart of FIG. 17 is a more simplistic control process of the control process illustrated in the flow chart of FIG. 16. Since some of the steps of the processing illustrated in FIGS. 9 and 16 are used in the alternate processing illustrated in FIG. 17, the identical processing steps will be given the same reference symbol.

In the processing illustrated in FIG. 17, when the main control unit 20 is turned "on", the electrical power from the battery 26 is supplied to the shifters 12 and 14 and the front and rear derailleurs 16 and 18. In step S10, the process of the flow chart of FIG. 16 starts when the main control unit 20 receives a front gear selection signal from one of the shift switches 141 and 143 of the left hand side shifter 112. More specifically, when the downshift (inward) operating lever 32 is pushed quickly (short pulse) such that the magnet 141b is disposed over the magnetic sensor 141a, the front derailleur downshift switch 141 outputs a front gear selection signal to the main control unit 20 for moving the front derailleur 16 to shift the chain 22 from the from the small front sprocket F1 to the large front sprocket F2. On the other hand, when the upshift (outward) operating lever 33 is pushed quickly (short pulse) such that the magnet 143b is disposed over the magnetic sensor 143a, the front derailleur upshift switch 143 outputs a front gear selection signal to the main control unit 20 for moving the front derailleur 16 to shift the chain 22 from the from the large front sprocket F2 to the small front sprocket F1.

In step S21, the main control unit 20 of the bicycle shifting controller determines if the front gear selection signal is received for less than a prescribed time threshold (e.g., less than 0.5 second). If the main control unit 20 determines the rider has quickly released the operating lever 32 or 33, then the process proceeds to step S20, where the main control unit 20 outputs a front gearshift signal to the FD microcomputer 76 of the front derailleur 16 in the same manner as discussed above with respect to FIG. 9. Then the process ends. However, if the main control unit 20 determines the rider has held the operating lever 32 or 33 for longer than the prescribed time threshold, then the process proceeds to step S71.

In step S71, the main control unit 20 outputs both the front gearshift signal and the rear-synchro gearshift signal. The main control unit 20 can selectively output the front gearshift signal and the rear-synchro gearshift signal at the same time, or first output the front gearshift signal and then output the rear-synchro gearshift signal, or first output the rear-synchro gearshift signal and then output the front gearshift signal. Depending on the current position of the chain 22 on the front and rear sprockets, it can be more preferably to the front derailleur 16 and then the rear derailleur 18 or vice-a-versa. For example, when downshifting (operating the downshift operating lever 32), it is preferred to first downshift the front derailleur 16 and then upshift the rear derailleur 18. On the other hand, when upshifting (operating the upshift operating lever 33), it is preferred to first downshift the rear derailleur 18 and then upshift the front derailleur 16. Thus, preferably, the main control unit 20 selectively outputs the front gearshift signal and the rear-synchro gearshift signal in different sequences depending on the current position of the chain 22 on the front and rear sprockets.

Figure 18:
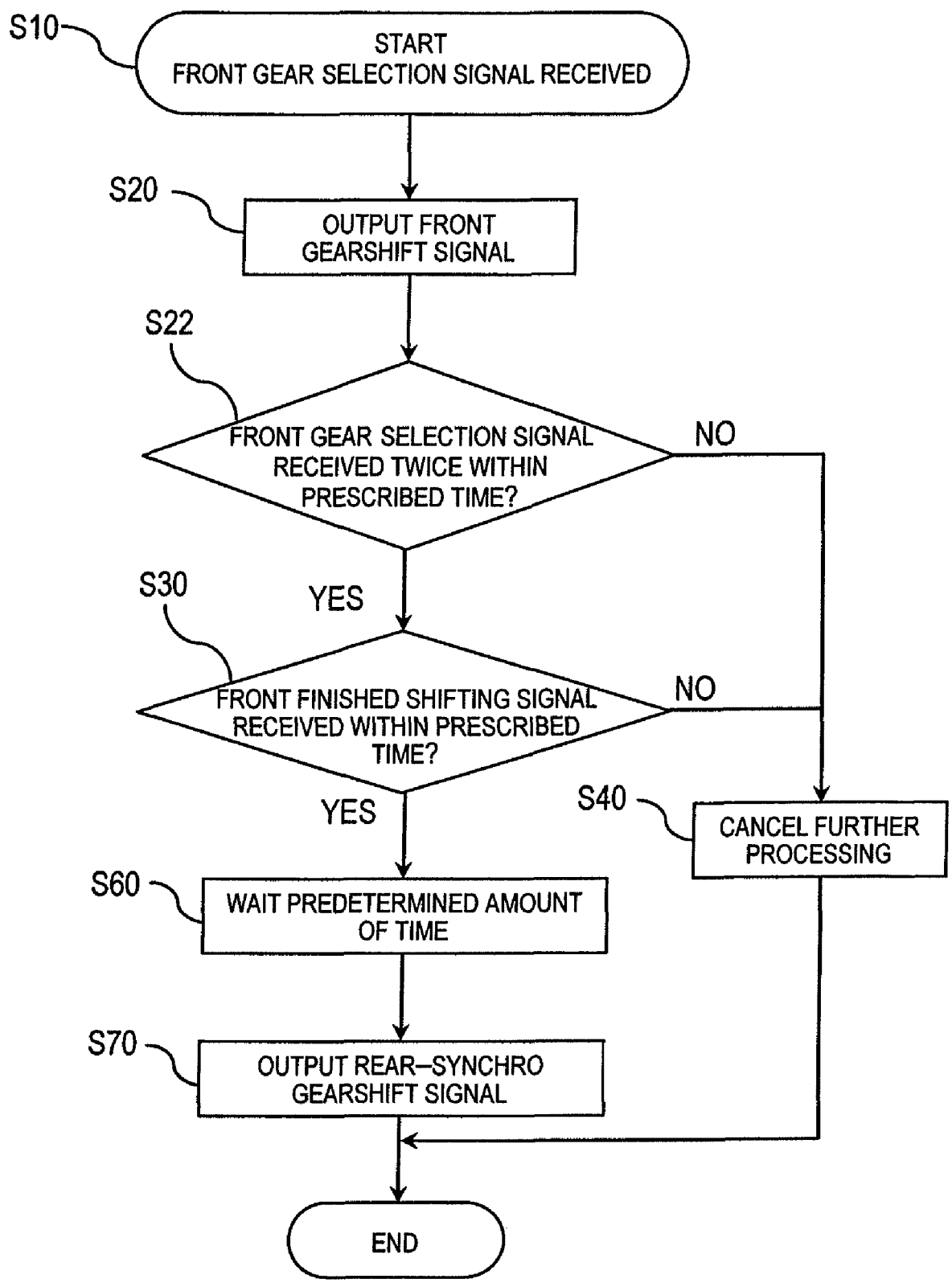
FIG. 18 is a flowchart showing a control processing executed by the controller of the bicycle shifting control apparatus for the second embodiment.
Figure 19:
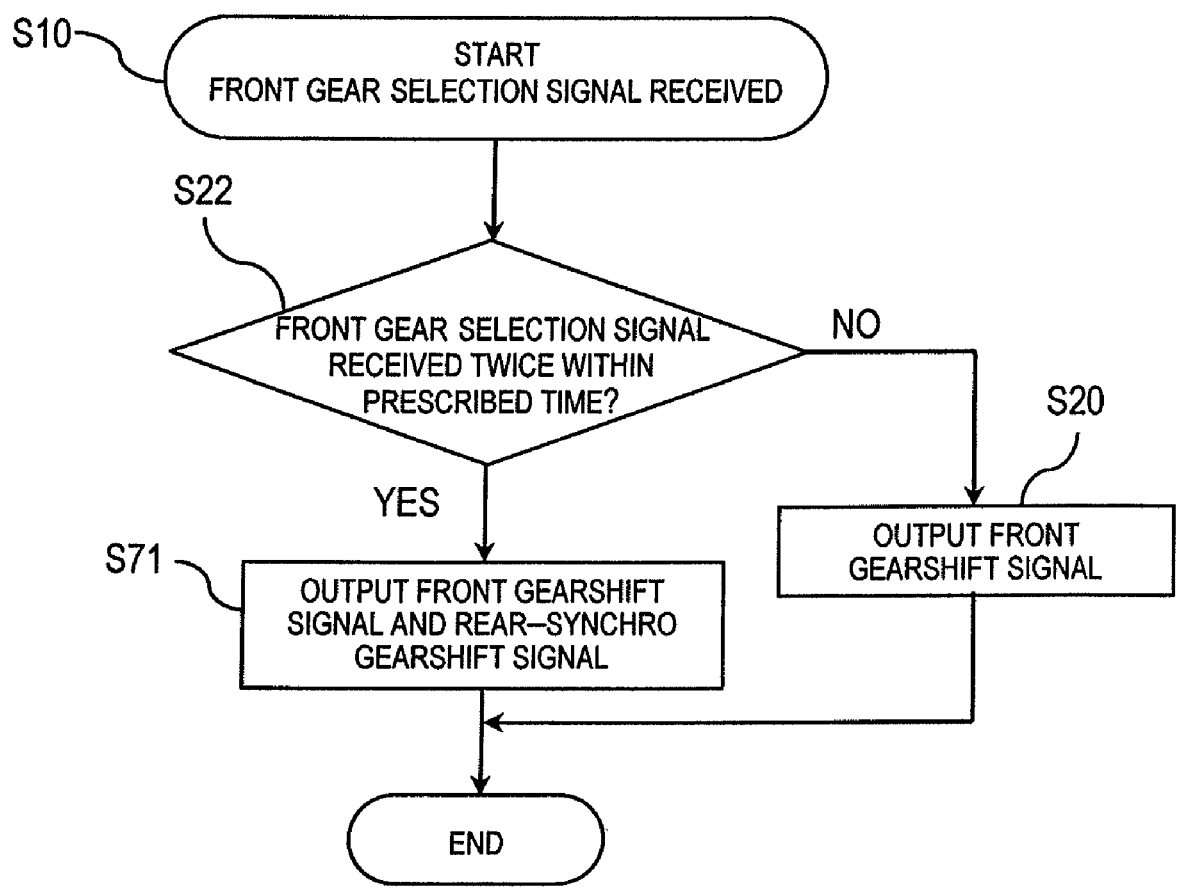
FIG. 19 is a flowchart showing an alternate control processing executed by the controller of the bicycle shifting control apparatus for the second embodiment.

Referring now to the flow charts of FIGS. 18 and 19, alternatively in this second embodiment, the single shifting operation is performed by pushing and releasing the operating levers 32 and 33 only once within a prescribed time (i.e., a single electrical signal pulse within a prescribed time) and the synchronized shifting operation is performed by pushing and releasing the operating levers 32 and 33 twice within a prescribed time (i.e., two electrical signal pulses within a prescribed time). In other words, if the rider only pushes one of the operating levers 32 and 33 once within a prescribed amount of time, then the only the front derailleur 16 is shifted. However, if the rider pushes one of the operating levers 32 and 33 twice within a prescribed amount of time, then the front and rear derailleurs 16 and 18 are both shifted in the same manner as discussed in the first embodiment.

As explained below, the alternate processing illustrated in FIGS. 18 and 19, the gearshift determination section of the main control unit 20 determines the first signal criteria for a single shifting operation is met when the first gear selection signal is received only once within a prescribed time threshold, and the gearshift determination section of the main control unit 20 determines the second signal criteria is met for performing a synchronized shifting operation when the first gear selection signal is received twice within the prescribed time threshold such that a second occurrence of the first gear selection signal constitutes the first/second gearshift signal.

As seen in the flow chart of FIG. 18, an alternate processing executed by the bicycle shifting controller (i.e., the main control unit 20, the FD microcomputer 76 and the RD microcomputer 86) will now be discussed that uses the left hand side shifter 112 illustrated in FIGS. 13 to 15. Since some of the steps of the processing illustrated in FIGS. 9 and 16 are used in the alternate processing illustrated in FIG. 18, the identical processing steps will be given the same reference symbol.

In the processing illustrated in FIG. 18, when the main control unit 20 is turned "on", the electrical power from the battery 26 is supplied to the shifters 12 and 14 and the front and rear derailleurs 16 and 18. In step S10, the process of the flow chart of FIG. 18 starts when the main control unit 20 receives a front gear selection signal from one of the shift switches 141 and 143 of the left hand side shifter 112 More specifically, when the downshift (inward) operating lever 32 is pushed such that the magnet 141*b* is disposed over the magnetic sensor 141*a*, the front derailleur downshift switch 141 outputs a front gear selection signal to the main control unit 20 for moving the front derailleur 16 to shift the chain 22 from the from the small front sprocket F1 to the large front sprocket F2. On the other hand, when the upshift (outward) operating lever 33 is pushed such that the magnet 143*b* is disposed over the magnetic sensor 143*a*, the front derailleur upshift switch 143 outputs a front gear selection signal to the main control unit 20 for moving the front derailleur 16 to shift the chain 22 from the from the large front sprocket F2 to the small front sprocket F1. Thus, the first gear shifting signal for performing a single shifting operation and the first/second gear shifting signal for performing a synchronized shifting operation are pulse signals with different pulse timings.

In step S20, the main control unit 20 outputs a front gearshift signal to the FD microcomputer 76 of the front derailleur 16 in the same manner as discussed above with respect to FIG. 9. Then the process proceeds to step S22.

In step S22, the main control unit 20 of the bicycle shifting controller determines if a second front gear selection signal has been received within a prescribed time (e.g., less than 0.5 second). If the main control unit 20 determines the rider has moved the operating lever 32 or 33 twice within the prescribed time, then the process proceeds to step S30. However, if the main control unit 20 determines the rider has the rider has only moved the operating lever 32 or 33 once within the prescribed time, then the process proceeds to step S40, where further processing of any signal from the shift switches 141 or 143 is canceled.

In step S30, the main control unit 20 of the bicycle shifting controller determines if the front finished shifting signal is received from the FD microcomputer 76 of the front derailleur 16 within a prescribed time (e.g., one or two seconds). If the front finished shifting signal is not received within the prescribed time, then the process proceeds to step S40, where further processing of any signal from the shift switches 141 or 143 is canceled. On the other hand, if the front finished shifting signal is received within the prescribed time, then the process proceeds to step S60.

In step S60, the main control unit 20 waits predetermined amount of time before proceeding to step S70. Step S60 may not be necessary in certain circumstances. For example, if the prescribed time in step S30 is sufficient to ensure that the shifting of the front derailleur 16 is completed by the time the processing proceeds to step S70, then step S60 can be eliminated. Moreover, steps S22 and S30 can provide a sufficient waiting period for allowing the shifting of the front derailleur 16 to be completed before starting the shifting of the rear derailleur 18. Thus, step S60 can be eliminated if steps S22 and S30 provide a sufficient waiting period.

In step S70, the rear-synchro gearshift signal is output from the main control unit 20 of the bicycle shifting controller to the rear derailleur 18 in the same manner as discussed above with respect to FIG. 9.

As seen in the flow chart of FIG. 19, an alternate processing executed by the bicycle shifting controller (i.e., the main control unit 20, the FD microcomputer 76 and the RD microcomputer 86) will now be discussed that uses the left hand side shifter 112 illustrated in FIGS. 13 to 15. Since some of the steps of the processing illustrated in FIGS. 9 and 18 are used in the alternate processing illustrated in FIG. 18, the identical processing steps will be given the same reference symbol.

In the processing illustrated in FIG. 19, when the main control unit 20 is turned "on", the electrical power from the battery 26 is supplied to the shifters 12 and 14 and the front and rear derailleurs 16 and 18. In step S10, the process of the flow chart of FIG. 17 starts when the main control unit 20 receives a front gear selection signal from one of the shift switches 141 and 143 of the left hand side shifter 112 More specifically, when the downshift (inward) operating lever 32 is pushed such that the magnet 141*b* is disposed over the magnetic sensor 141*a*, the front derailleur downshift switch 141 outputs a front gear selection signal to the main control unit 20 for moving the front derailleur 16 to shift the chain 22 from the from the small front sprocket F1 to the large front sprocket F2. On the other hand, when the upshift (outward) operating lever 33 is pushed such that the magnet 143*b* is disposed over the magnetic sensor 143*a*, the front derailleur upshift switch 143 outputs a front gear selection signal to the main control unit 20 for moving the front derailleur 16 to shift the chain 22 from the from the large front sprocket F2 to the small front sprocket F1.

In step S22, the main control unit 20 of the bicycle shifting controller determines if a second front gear selection signal has been received within a prescribed time (e.g., less than 0.5 second). If the main control unit 20 determines the rider has not moved the operating lever 32 or 33 twice within the prescribed time, then the process proceeds to step S20, where the main control unit 20 outputs a front gearshift signal to the FD microcomputer 76 of the front derailleur 16 in the same manner as discussed above with respect to FIG. 9. Then the process ends. However, if the main control unit 20 determines the rider has moved the operating lever 32 or 33 twice within the prescribed time, then the process proceeds to step S71.

In step S71, the main control unit 20 outputs both the front gearshift signal and the rear-synchro gearshift signal. The main control unit 20 can selectively output the front gearshift signal and the rear-synchro gearshift signal at the same time, or first output the front gearshift signal and then output the rear-synchro gearshift signal, or first output the rear-synchro gearshift signal and then output the front gearshift signal. Depending on the current position of the chain 22 on the front and rear sprockets, it can be more preferably to the front derailleur 16 and then the rear derailleur 18 or vice-a-versa. For example, when downshifting (operating the downshift operating lever 32), it is preferred to first downshift the front derailleur 16 and then upshift the rear derailleur 18. On the other hand, when upshifting (operating the upshift operating lever 33), it is preferred to first downshift the rear derailleur 18 and then upshift the front derailleur 16. Thus, preferably, the main control unit 20 selectively outputs the front gearshift signal and the rear-synchro gearshift signal in different sequences depending on the current position of the chain 22 on the front and rear sprockets.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle shifting control apparatus comprising:
    a gear selection signal receiving section that selectively receives a first gear selection signal and a second gear selection signal;
    a gearshift determination section that
        determines a first shift intention for a first gear shifting when the first gear selection signal is received by the gear selection signal receiving section, which meets a first signal criteria, and
        determines a second shift intention for performing a second gear shifting in addition to the first shifting when the second gear selection signal is received by the gear selection signal receiving section, which meets a second signal criteria that is different from the first signal criteria; and
    a gearshift output section that selectively outputs a first gearshift signal upon the gearshift determination section determining the first shift intention and that selectively outputs a second gearshift signal in addition to outputting the first gearshift signal upon the gearshift determination section determining the second shift intention,
    the gearshift output section outputting the first gearshift signal for upshifting to a higher speed by changing one gear at a time and outputting the second gearshift signal for downshifting to a lower speed by one or a prescribed number of gear changed at a time.

2. The bicycle shifting control apparatus according to claim 1, wherein
    the gearshift determination section determines the first signal criteria is met when the first gear selection signal is received via a first input of the gear selection signal receiving section, and the gearshift determination section determines the second signal criteria is met when the second gear selection signal is received via a second input of the gear selection signal receiving section that is different than the first input of the gear selection signal receiving section.

3. The bicycle shifting control apparatus according to claim 1, wherein
    the gearshift determination section determines the first signal criteria is met when the first gear selection signal is received for an amount of time that is less than a prescribed time threshold, and the gearshift determination section determines the second signal criteria is met when the first gear selection signal is received for an amount of time that is equal to or greater than the prescribed time threshold such that a signal with prescribed length or longer of the first gear selection signal constitutes the second gearshift signal.

4. The bicycle shifting control apparatus according to 1, wherein
    the first gear selection signal and the second gear selection signal are pulse signals with different pulse lengths.

5. The bicycle shifting control apparatus according to claim 1, wherein
    the gearshift determination section determines the first signal criteria is met when the first gear selection signal is received only once within a prescribed time threshold, and the gearshift determination section determines the second signal criteria is met when the first gear selection signal is received twice within the prescribed time threshold such that a second occurrence of the first gear selection signal constitutes the second gearshift signal.

6. The bicycle shifting control apparatus according to claim 1, wherein
    the first gear selection signal and the second gear selection signal are pulse signals with different pulse timings.

7. The bicycle shifting control apparatus according to claim 1, wherein
    the gearshift determination section further
        determines a third shift intention for a third gear shifting when a third gear selection signal is received by the gear selection signal receiving section, which meets a third signal criteria, and
        determines a fourth shift intention for performing a fourth gear shifting in addition to the third shifting when a fourth gear selection signal is received by the gear selection signal receiving section, which meets a fourth signal criteria that is different from the third signal criteria;
    the gearshift output section outputs a third gearshift signal upon the gearshift determination section determining the third shift intention and that outputs a fourth gearshift signal upon the gearshift determination section determining that the fourth shift intention;
    the gearshift output section selectively outputs the third gearshift signal for downshifting to a lower speed by changing one gear at a time and selectively outputs the fourth gearshift signal for upshifting to a higher speed by one or a prescribed number of gear changed at a time.

8. A bicycle shifting control apparatus comprising:
a gear selection signal receiving section that selectively receives a first gear selection signal and a second gear selection signal;
a gearshift determination section that
determines a first shift intention for a first gear shifting when the first gear selection signal is received by the gear selection signal receiving section, which meets a first signal criteria, and
determines a second shift intention for performing a second gear shifting in addition to the first shifting when the second gear selection signal is received by the gear selection signal receiving section, which meets a second signal criteria that is different from the first signal criteria;
a gearshift output section that selectively outputs a first gearshift signal upon the gearshift determination section determining the first shift intention and that selectively outputs a second gearshift signal in addition to outputting the first gearshift signal upon the gearshift determination section determining that the second shift intention; and
a first gearshift operating device having a first single rider gear input member that is selectively operable in a first operation manner that produces the first gear selection signal and that is selectively operable in a second operation manner that produces the second gear selection signal.

9. The bicycle shifting control apparatus according to claim 8, further comprising
a second gearshift operating device that is a physically separate from the first gearshift operating device with the second gearshift operating device having a rider gear input member that produces a gear selection signal.

10. The bicycle shifting control apparatus according to claim 9, further comprising
a first gear shifting device operated by the first gearshift operating device in response to the first single rider gear input member of the first gearshift operating device being operated in the first and second operation manners, and
a second gear shifting device selectively operated by the first and second gearshift operating devices in response to the first single rider gear input member of the first gearshift operating device being operated in the second operation manner and operation of the gear input member of the second gearshift operating device.

11. The bicycle shifting control apparatus according to claim 10, wherein
the first gearshift operating device includes a gear downshift operating member and a gear upshift operating member, with one of the downshift and upshift operating members of the first gearshift operating device constituting the first single rider gear input member and the other of the downshift and upshift operating members of the first gearshift operating device constituting a second single rider gear input member, each of the downshift and upshift operating members of the first gearshift operating device being operable in the first and second operation manners.

12. The bicycle shifting control apparatus according to claim 11, wherein
the second gearshift operating device includes a gear downshift operating member that produces a downshift gear selection signal and a gear upshift operating member that produces an upshift gear selection signal, with the rider gear input member of the second gearshift operating device constituting one of the gear downshift operating member and the gear upshift operating member and the other of the gear downshift operating member and the gear upshift operating member constituting another rider gear input member of the second gearshift operating device.

13. The bicycle shifting control apparatus according to claim 10, wherein
the first gearshift operating device includes a gear downshift operating member and a gear upshift operating member, with each of the downshift and upshift operating members of the first gearshift operating device being operable in the first and second operation manners such that operation of the gear downshift operating member in the first operation manner results in the controller operating the first gear shifting device in a first gear downshift direction and operation of the gear downshift operating member in the second operation manner results in the controller operating the first gear shifting device in the first gear downshift direction and the second gear shifting device in a second gear upshift direction, and such that operation of the gear upshift operating member in the first operation manner results in the controller operating the first gear shifting device in a first gear upshift direction and operation of the gear upshift operating member in the second operation manner results in the controller operating the first gear shifting device in the first gear upshift direction and the second gear shifting device in a second downshift direction.

14. The bicycle shifting control apparatus according to claim 10, wherein
the first and second gear shifting devices are configured such that a value of change when only the first gear shifting device is changed one speed is larger than a value of change that when only the second gear shifting device is changed one speed.

15. The bicycle shifting control apparatus according to claim 8, wherein
the first single rider gear input member of the first gearshift operating device is movably mounted to move between a rest position, a first operation position and a second operation position that is past the first operation position during a single progressive stroke of the first single rider gear input member from the rest position to the second operation position such that the first operation manner occurs when the first single rider gear input member is moved from the rest position to the first operation position and such that the second operation manner occurs when the first single rider gear input member is moved from the rest position to the second operation position.

16. The bicycle shifting control apparatus according to claim 8, wherein
the first gearshift operating device includes a gear downshift operating member and a gear upshift operating member, with one of the downshift and upshift operating members of the first gearshift operating device constituting the first single rider gear input member and the other of the downshift and upshift operating members of the first gearshift operating device constituting a second single rider gear input member, each of the downshift and upshift operating members of the first gearshift operating device being movably such that the first operation manner occurs when the downshift and upshift operating members of the first gearshift operating device are moved from a rest position to an operation position and then returned to the rest position within a predetermined time and such that the second operation manner occurs when the downshift and upshift operating members of the first gearshift operating device are moved from the rest position to the operation position and held in the operation position for longer than the predetermined time.

17. The bicycle shifting control apparatus according to claim 8, wherein
the first gearshift operating device includes a gear downshift operating member and a gear upshift operating member, with one of the downshift and upshift operating members of the first gearshift operating device constituting the first single rider gear input member and the other of the downshift and upshift operating members of the first gearshift operating device constituting a second single rider gear input member, each of the downshift and upshift operating members of the first gearshift operating device being movably such that the first operation manner occurs when the downshift and upshift operating members of the first gearshift operating device are only moved once moved from a rest position to an operation position and then returned to the rest position within a predetermined time and such that the second operation manner occurs when the downshift and upshift operating members of the first gearshift operating device are twice moved from the rest position to the operation position within the predetermined time.

18. A bicycle shifting control apparatus comprising:
a gear selection signal receiving section that selectively receives a first gear selection signal and a second gear selection signal;
a gearshift determination section that
determines a first shift intention for a first gear shifting when the first gear selection signal is received by the gear selection signal receiving section, which meets a first signal criteria, and
determines a second shift intention for performing a second gear shifting in addition to the first shifting when the second gear selection signal is received by the gear selection signal receiving section, which meets a second signal criteria that is different from the first signal criteria; and
a gearshift output section that selectively outputs a first gearshift signal upon the gearshift determination section determining the first shift intention and that selectively outputs a second gearshift signal in addition to outputting the first gear shift signal upon the gearshift determination section determining that the second shift intention,
the gearshift output section outputting the first gearshift signal for downshifting to a lower speed by changing one gear at a time and outputting the second gearshift signal for upshifting to a higher speed by one or a prescribed number of gear changed at a time.

19. The bicycle shifting control apparatus according to claim 18, wherein
the gearshift determination section determines the first signal criteria is met when the first gear selection signal is received via a first input of the gear selection signal receiving section, and the gearshift determination section determines the second signal criteria is met when the second gear selection signal is received via a second input of the gear selection signal receiving section that is different than the first input of the gear selection signal receiving section.

20. The bicycle shifting control apparatus according to claim 18, wherein
the gearshift determination section determines the first signal criteria is met when the first gear selection signal is received for an amount of time that is less than a prescribed time threshold, and the gearshift determination section determines the second signal criteria is met when the first gear selection signal is received for an amount of time that is equal to or greater than the prescribed time threshold such that a signal with prescribed length or longer of the first gear selection signal constitutes the second gearshift signal.

21. The bicycle shifting control apparatus according to claim 18, wherein
the first gear selection signal and the second gear selection signal are pulse signals with different pulse lengths.

22. The bicycle shifting control apparatus according to claim 18, wherein
the gearshift determination section determines the first signal criteria is met when the first gear selection signal is received only once within a prescribed time threshold, and the gearshift determination section determines the second signal criteria is met when the first gear selection signal is received twice within the prescribed time threshold such that a second occurrence of the first gear selection signal constitutes the second gearshift signal.

23. The bicycle shifting control apparatus according to claim 18, wherein
the first gear selection signal and the second gear selection signal are pulse signals with different pulse timings.

* * * * *